United States Patent
Park et al.

(10) Patent No.: US 11,487,417 B2
(45) Date of Patent: Nov. 1, 2022

(54) USER TERMINAL APPARATUS AND CONTROL METHOD FOR CONTROLLING INTERNET OF THINGS DEVICES

(71) Applicant: Samsung Electronics Co., Ltd., Suwon-si (KR)

(72) Inventors: Eun-chan Park, Seoul (KR); Ah-reum Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/015,476

(22) Filed: Sep. 9, 2020

(65) Prior Publication Data
US 2020/0401304 A1    Dec. 24, 2020

Related U.S. Application Data

(63) Continuation of application No. 15/388,493, filed on Dec. 22, 2016, now Pat. No. 10,809,902.

(30) Foreign Application Priority Data

Dec. 29, 2015    (KR) .......................... 10-2015-0188274

(51) Int. Cl.
*G06F 3/04847*    (2022.01)
*G06F 3/04883*    (2022.01)
(Continued)

(52) U.S. Cl.
CPC ........ *G06F 3/04847* (2013.01); *G06F 3/0482* (2013.01); *G06F 3/0488* (2013.01);
(Continued)

(58) Field of Classification Search
CPC ............. G06F 3/04847; G06F 3/04883; G06F 3/0482; G06F 3/04845; G06F 3/0488;
(Continued)

(56) References Cited

U.S. PATENT DOCUMENTS

| 7,640,327 B2* | 12/2009 | Humpleman ....... H04L 12/2803 348/461 |
| 8,042,048 B2 | 10/2011 | Wilson et al. |

(Continued)

FOREIGN PATENT DOCUMENTS

| CN | 102122319 A | 7/2011 |
| CN | 103098449 A | 5/2013 |

(Continued)

OTHER PUBLICATIONS

Korean Office Action dated Aug. 21, 2020, issued in Korean Application No. 10-2015-0188274.

(Continued)

*Primary Examiner* — Nicholas Klicos
(74) *Attorney, Agent, or Firm* — Jefferson IP Law, LLP

(57) ABSTRACT

An Internet of things (IoT) environment-based user terminal apparatus is provided. The user terminal apparatus includes a transceiver configured to perform communication with a plurality of devices constituting an IoT environment, a display device configured to display a user interface which includes a first object list including a first object indicating a first device in which a specific condition is set among the plurality of devices and a second object list including a second object indicating a second device configured to provide an alarm, and a processor configured to control the first device and the second device so that the second device is set to provide the alarm in response to satisfaction of the specific condition set to the first device, in response to the first object being selected from the first object list and the second object being selected from the second object list through the user interface.

12 Claims, 17 Drawing Sheets

(51) Int. Cl.
*H04L 12/28* (2006.01)
*G06F 3/0482* (2013.01)
*G06F 3/04845* (2022.01)
*G06F 3/0488* (2022.01)
*G06F 3/04886* (2022.01)

(52) U.S. Cl.
CPC ...... *G06F 3/04845* (2013.01); *G06F 3/04883* (2013.01); *G06F 3/04886* (2013.01); *H04L 12/2803* (2013.01); *G06F 2203/04808* (2013.01)

(58) Field of Classification Search
CPC ....... G06F 3/04886; G06F 2203/04808; H04L 12/2803; H04L 12/2807; H04L 12/2809; H04L 12/2812; H04L 12/2814; H04L 12/2823; H04L 12/2827; H04L 12/2829
See application file for complete search history.

(56) References Cited

U.S. PATENT DOCUMENTS

| | | | |
|---|---|---|---|
| 9,311,811 B1* | 4/2016 | Szewczyk | H04L 63/0823 |
| 9,554,756 B2 | 1/2017 | Menzel | |
| 10,043,382 B2 | 8/2018 | Noh | |
| 2004/0260427 A1* | 12/2004 | Wimsatt | G05B 15/02 700/275 |
| 2005/0268109 A1* | 12/2005 | McIntosh | H04L 63/0428 713/182 |
| 2007/0014244 A1 | 1/2007 | Srinivasan et al. | |
| 2007/0055757 A1* | 3/2007 | Mairs | H04L 12/281 709/223 |
| 2009/0157198 A1 | 6/2009 | Morikawa | |
| 2009/0243852 A1* | 10/2009 | Haupt | G08B 25/14 340/541 |
| 2011/0140896 A1 | 6/2011 | Menzel | |
| 2012/0130513 A1* | 5/2012 | Hao | G05B 15/02 700/90 |
| 2013/0106738 A1 | 5/2013 | Kim et al. | |
| 2013/0113822 A1* | 5/2013 | Putrevu | G05B 15/02 345/619 |
| 2013/0159400 A1 | 6/2013 | Fujii et al. | |
| 2013/0173062 A1* | 7/2013 | Koenig-Richardson | G05B 15/02 700/275 |
| 2014/0059494 A1* | 2/2014 | Lee | G06F 3/0482 715/835 |
| 2014/0098247 A1* | 4/2014 | Rao | H04W 4/20 348/207.1 |
| 2014/0108943 A1* | 4/2014 | Lee | H04W 4/18 715/738 |
| 2014/0176316 A1 | 6/2014 | Noh | |
| 2014/0244001 A1 | 8/2014 | Glickfield et al. | |
| 2015/0019710 A1 | 1/2015 | Shaashua et al. | |
| 2015/0019714 A1* | 1/2015 | Shaashua | H04L 12/2818 709/224 |
| 2015/0058802 A1* | 2/2015 | Turaj | H04L 41/12 715/810 |
| 2015/0100618 A1* | 4/2015 | Le Guen | H04W 76/15 709/201 |
| 2015/0160797 A1* | 6/2015 | Shearer | H04L 12/2816 715/740 |
| 2015/0163411 A1 | 6/2015 | McCarthy, III et al. | |
| 2015/0215171 A1 | 7/2015 | Humpleman et al. | |
| 2016/0072806 A1* | 3/2016 | Kim | H04W 48/16 726/5 |
| 2016/0240060 A1* | 8/2016 | Wang | H04L 12/6418 |
| 2016/0259308 A1* | 9/2016 | Fadell | H04W 4/80 |
| 2016/0330712 A1 | 11/2016 | Bleakley et al. | |
| 2017/0063611 A1* | 3/2017 | Sheba | H04L 41/22 |
| 2017/0171090 A1* | 6/2017 | Britt | H04L 47/2475 |
| 2017/0278378 A1 | 9/2017 | Kaplita et al. | |

FOREIGN PATENT DOCUMENTS

| | | |
|---|---|---|
| CN | 103905893 A | 7/2014 |
| JP | 2006-246026 A | 9/2006 |
| JP | 2009-146146 A | 7/2009 |
| KR | 10-1240274 B1 | 3/2013 |
| KR | 10-2013-0048533 A | 5/2013 |
| WO | 2012/032714 A1 | 3/2012 |

OTHER PUBLICATIONS

Extended European Search Report dated Jul. 9, 2018, issued in the Extended European Patent Application No. 16882137.9-1216/3353636.

Davar Pishva et al., Product-Based Security Model for Smart Home Appliances, Oct. 1, 2008, IEEE A&E Systems Magazine, pp. 32-40 (Year: 2008).

Chinese Office Action dated Dec. 2, 2020, issued in Chinese Application No. 201680076873.8.

Indian Examination Report dated May 13, 2021, issued in Indian Application No. 201817027942.

* cited by examiner

USER TERMINAL APPARATUS AND CONTROL METHOD FOR CONTROLLING INTERNET OF THINGS DEVICES

CROSS-REFERENCE TO RELATED APPLICATION(S)

This application is a continuation application of prior application Ser. No. 15/388,493, filed on Dec. 22, 2016, and is based on and claims priority under 35 U.S.C § 119(a) of a Korean patent application number 10-2015-0188274, filed on Dec. 29, 2015, in the Korean Intellectual Property Office, the disclosure of which is incorporated by reference herein in its entirety.

TECHNICAL FIELD

The present disclosure relates to a user terminal apparatus and a control method thereof. More particularly, the present disclosure relates to a user terminal apparatus capable of controlling a plurality of devices and a control method thereof.

BACKGROUND

In recent years, due to development of information technology (IT), various Internet of things (IoT) gadgets available to the user are expected to be generalized. Accordingly, connection technology between various apparatuses in IoT environments is expected to be more important.

The IoT technology may have high utilization even for the purpose of controlling various home appliances in home. The user may couple various home appliances such as a television (TV), a washing machine, and an air conditioner through wired and wireless networks and control the various home appliances through information sharing and various linkages of the home appliances in home under the IoT environments.

Researches on user terminal apparatuses for providing user interface environments which control various functions of various devices in the IoT environments have been widely conducted. However, through the method of liking a plurality of devices through the user terminal apparatus in the related IoT environments, it may be difficult for the user to intuitively determine a device which is displayed through the user terminal apparatus, to set the mutual connection therebetween, and to easily determine the connection relationship, and thus the process for linking the plurality of devices may be complicated. Even in response to the plurality of devices being linked, it may also be difficult for the user to set the functions and operations of the devices according to the linkage.

Therefore, there is a need for a method for more intuitively linking a plurality of devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal apparatus which provides a user interface (UI) for more intuitively linking a plurality of devices, and a control method thereof.

In accordance with an aspect of the present disclosure, an Internet of things (IoT) environment-based user terminal apparatus is provided. The IoT environment-based user terminal apparatus includes a transceiver configured to perform communication with a plurality of devices constituting the IoT environment, a display device configured to display a UI which includes a first object list including a first object indicating a first device in which a specific condition is set among the plurality of devices, and a second object list including a second object indicating a second device configured to provide an alarm, and at least one processor configured to control the first device and the second device so that the second device is set as a device which provides the alarm in response to satisfaction of the specific condition set to the first device, in response to the first object being selected from the first object list and the second object being selected from the second object list through the user interface.

The at least one processor may control the transceiver to transmit, to the first device, a control signal, which sets a signal according to the satisfaction of the specific condition to be transmitted to the second device, and transmit, to the second device, a control signal, which sets the alarm to be provided in response to the signal according to the satisfaction of the specific condition being received in the second device.

The at least one processor may control the display device to display a graphic UI (GUI), which indicates that the devices corresponding to the selected objects are mutually coupled, in a state that the first object list and the second object list are simultaneously displayed in response to the first object and the second object being selected from the first object list and the second object list.

The GUI may be a coupling indicator illustrating a coupling of the selected objects.

The at least one processor may select the first device and the second device in response to a touch and drag being performed from a region in which the first object is located to a region in which the second object is located.

The at least one processor may control the display device to display a menu for setting the specific condition on a periphery of the first object selected from the first object list.

The at least one processor may control the display device to display a menu for setting an operation for providing the alarm on a periphery of the second object selected from the second object list.

The at least one processor may store connection information of the first device and the second device as a device which provides the alarm according to the satisfaction of the specific condition in a list form.

In response to a third object being additionally selected from the second object list, the at least one processor may control a third device corresponding to the additionally selected third object to be set as a device which additionally provides another alarm.

The second object list may further include a third object indicating a third device configured to provide another alarm, and, in response to the third object being selected from the second object list, the at least one processor is may control the third device to be set as a device which provides the other alarm when the second device cannot provide the alarm.

The at least one processor may control the display device to display a graphic user interface (GUI), which indicates that the devices corresponding to the second object and the third object are mutually coupled, in a state that the first object list and the second object list are simultaneously displayed in response to the third object being selected from the second object list to provide the other alarm when the second device cannot provide the alarm The at least one processor may determine a pre-set priority for the plurality of devices corresponding to a plurality of objects included in the first object list and controls the display device to display information for the plurality of devices corresponding to the plurality of objects in a high priority order.

In accordance with another aspect of the present disclosure, a method of controlling an IoT environment-based user terminal apparatus is provided. The method includes displaying a UI which includes a first object list including a first object indicating a first device in which a specific condition is set among a plurality of devices constituting the IoT environment, and a second object list including a second object indicating a second device which provides an alarm, selecting the first object from the first object list and the second object from the second object list through the UI, and controlling the first device and the second device so that the second device is set as a device which provides the alarm in response to satisfaction of the specific condition set to the first device.

The controlling may include transmitting, to the second device, a control signal, which sets a signal according to the satisfaction of the specific condition to be transmitted to the second device, and transmitting, to the second device, a control signal, which sets the alarm to be provided in response to the signal according to the satisfaction of the specific condition being received in the second device.

The method may further include displaying a GUI which indicates that the devices corresponding to the selected objects are mutually coupled in a state that the first object list and the second object list are simultaneously displayed in response to the first object and the second object being selected from the first object list and the second object list.

The GUI may be a coupling indicator illustrating a coupling of the selected objects.

The selecting may include selecting the first device and the second device in response to a touch and drag being performed from a region in which the first object is located to a region in which the second object is located.

The method may further include displaying a menu for setting the specific condition on a periphery of the first object selected from the first object list.

The method may further include displaying a menu for setting an operation for providing the alarm on a periphery of the second object selected from the second object list.

The method may further include storing connection information of the first device and the second device as a device which provides the alarm according to the satisfaction of the specific condition in a list form.

The controlling may include, in response to a third object being additionally selected from the second object list, controlling a third device corresponding to the additionally selected third object to be set as a device which additionally provides another alarm.

The second object list may further include a third object indicating a third device configured to provide another alarm, and, in response to the third object being selected from the second object list, the controlling further includes controlling the third device to be set as a device which provides the other alarm when the second device cannot provide the alarm.

The method may further include displaying a graphic user interface (GUI), which indicates that the devices corresponding to the second object and the third object are mutually coupled, in a state that the first object list and the second object list are simultaneously displayed in response to the third object being selected from the second object list to provide the other alarm when the second device cannot provide the alarm.

The method may further include determining a pre-set priority for the plurality of devices corresponding to a plurality of objects included in the first object list, and the displaying may include displaying information for the plurality of devices corresponding to the plurality of objects in a high priority order.

According to various embodiments, the convenience of the user may be increased by more intuitively linking a plurality of devices through a user terminal apparatus in an IoT environment.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
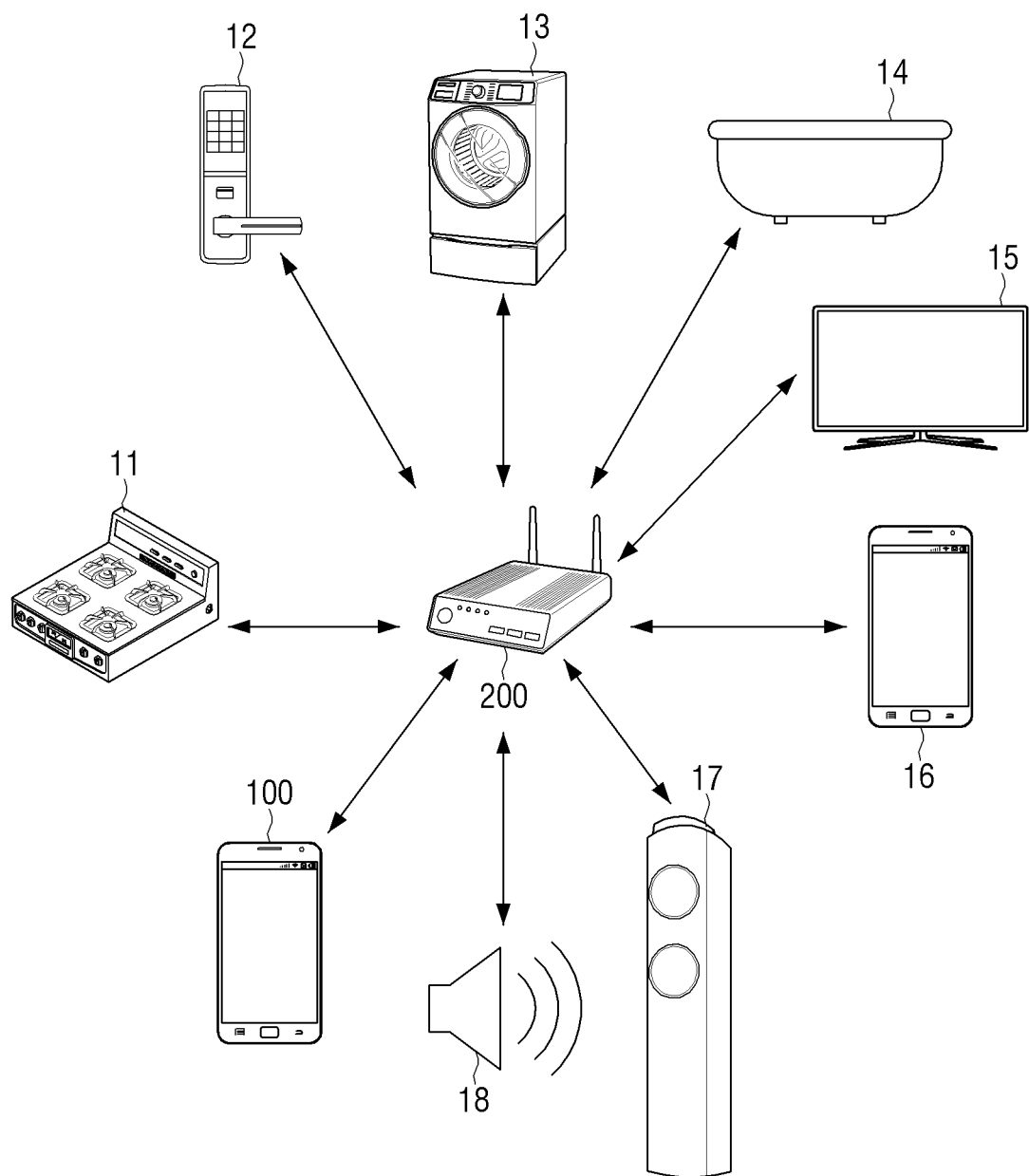
FIG. 1 is a diagram illustrating a plurality of devices constituting an Internet of things (IoT) environment and a user terminal apparatus for controlling the devices according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A portion of the terms used herein may be terms arbitrarily selected by the applicant. It will be further understood that the terms used herein should be interpreted as the meaning defined herein. Unless otherwise defined, all terms including technical and scientific terms used herein have the same meaning as commonly understood by one of ordinary skill in the art to which the present disclosure belongs.

In the following description, unless otherwise described, the same reference numerals or symbols are used for the same elements or components which substantially perform the same functions when they are depicted in different drawings. The same reference numerals or symbols are used to assist in a comprehensive understanding of other embodiments. Thus, it is understood that a plurality of drawings may not illustrate one embodiment even when all the elements denoted with the same reference numerals depicted in the plurality of drawings.

It will be understood that the terms first, second, third, etc. may be used herein to describe various elements and/or components regardless of the order and/or importance, and these elements and/or components should not be limited by these terms. These terms are only used to distinguish one element or component. For example, the use and arrangement sequence and the like of the elements combined with the ordinals should not be narrowly interpreted. Thus, without departing from the scope in the document, a first element and/or component discussed below could be termed a second element and/or component, and vice versa.

It will be further understood that the terms "comprises," "comprising," "includes," and/or "including," when used herein, specify the presence of stated features, integers, operations, elements, components, and/or groups thereof, but do not preclude the presence or addition of one or more other features, integers, operations, elements, components, and/or groups thereof.

In various embodiments, the term "module", "unit", or "part" may refer to a component which performs at least one function or operation and may be implemented with hardware, software, or a combination thereof "plurality of modules", "plurality of units", or "plurality of parts" may be implemented with at least one processor (not shown) by integrating the modules, units or parts as at least one module or chip other than "modules", "units", or "parts" which need to be implemented with separate specific hardware.

It will be understood that when an element (for example, a first element) is referred to as being "coupled with/to" or "connected to" another element (for example, a second element), it can be directly connected or coupled to the other element or intervening elements (for example, third elements) may be present. In contrast, when an element is referred to as being "directly connected to" or "directly coupled to" another element, there are no intervening elements or layers present.

Hereinafter, the various embodiments will be described in greater detail with reference to the accompanying drawings.

FIG. 1 is a diagram illustrating a plurality of devices constituting an Internet of things (IoT) environment and a user terminal apparatus configured to control the devices according to an embodiment of the present disclosure.

Referring to FIG. 1, the IoT environment according to an embodiment may include a plurality of devices 11 to 18 and a user terminal apparatus 100 configured to control the devices 11 to 18. The IoT environment may further include an access point (AP) 200 configured to relay the plurality of devices 11 to 18 and the user terminal apparatus 100. The user terminal apparatus 100 may transmit and receive data to and from the plurality of devices 11 to 18 according to various communication standards such as an infrared manner, a radio frequency (RF) manner, a near field communication (NFC) manner, ZigBee, or digital living network alliance (DLNA). The user terminal apparatus 100 may be coupled to a wired/wireless network including an Internet network and may perform transmit and receive data to and from the plurality of devices 11 to 18.

The user terminal apparatus 100 according to an embodiment may control the plurality of devices 11 to 18 and transmit control signals for controlling the plurality of devices 11 to 18 to the plurality of devices 11 to 18 through the above-described various communication manners. For example, the user terminal apparatus 100 may directly transmit the control signals to the plurality of devices 11 to 18 or may transmit the control signals to the plurality of devices 11 to 18 through the AP 200. The user terminal apparatus 100 may transmit a control signal for transmitting a control signal for controlling another device in response to a specific condition for one device among the plurality of devices is satisfied.

For example, the plurality of devices 11 to 18 may include a cooker 11 such as a microwave oven or a gas range, a door lock 12, a washing machine 13, a bathtub 14, a television (TV) 15, a smart phone 16, an air conditioner 17, a speaker 18, and the like.

The user terminal apparatus 100 may include various types of apparatuses in which a function or an application which may control the plurality of devices 11 to 18 is installed, for example, a portable terminal such as a tablet personal computer (PC), a portable phone, a smart phone, a personal digital assistant (PDA), a Moving Picture Experts Group phase 1 or phase 2 (MPEG-1 or MPEG-2) audio layer 3 (MP3) player, an electronic photo frame, and a portable multimedia player (PMP), various types of wearable apparatuses such as smart glasses, and the like.

Figure 2:
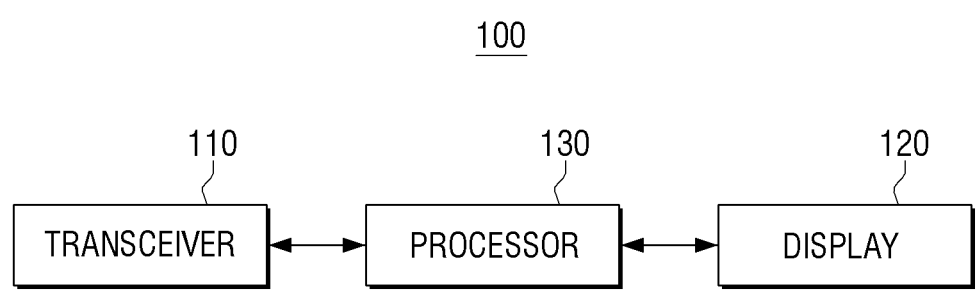
FIG. 2 is a schematic block diagram illustrating a configuration of a user terminal apparatus according to an embodiment of the present disclosure.

FIG. 2 is a schematic block diagram illustrating a configuration of a user terminal apparatus according to an embodiment of the present disclosure.

Referring to FIG. 2, the user terminal apparatus 100 may include a transceiver 110, a display device 120, and a processor 130.

The transceiver 110 may be configured to perform communication with a plurality of devices. The transceiver 110 may perform short-range wireless communication with the plurality of devices. The transceiver 110 may be coupled to the plurality of devices through a network according to various communication standards such as Bluetooth, RF identification (RFID), infrared data association (IrDA), ultra wideband (UWB), ZigBee, and DLNA.

For example, the transceiver 110 may directly perform communication with the plurality of devices. In another example, the transceiver 110 may perform communication with the plurality of devices through a repeater or router, such as the AP 200.

The transceiver 110 may include an interface for coupling to a wired or a wireless network, including an Internet network. For example, the transceiver 110 may include an Ethernet terminal and the like for coupling to the wired network and a communication transceiver for connection with the wireless network using a communication scheme such as wireless local area network (WLAN), Wi-Fi, wireless broadband (Wibro), world interoperability for micro access (Wimax), or high speed downlink packet access (HSDPA).

The display device 120 may be configured to display a user interface (UI) for controlling the plurality of devices. The display device 120 may be implemented with various types of displays such as a liquid crystal display (LCD), an organic light emitting diode (OLED), a liquid crystal on silicon (LCoS), and a digital light processing (DLP). A driving circuit, which is implemented in a form of an amorphous silicon thin film transistor (a-si TFT), a low temperature polysilicon (LTPS) TFT, an organic TFT (OTFT), and the like, a backlight unit, and the like may be included in the display device 120, The display device 120 may be implemented with a touch display which may input a user command through a user's touch. For example, the user may input desired information by touching various pieces of content displayed in the display device 120 using a finger or an electronic pen. In this example, the display device 120 may be implemented with a touch screen which serves to display the content and simultaneously serves as a touch pad. A tempered glass substrate, a protection film, and the like may be provided in a front of the display device 120 in which a touch is accomplished to protect the display device 120.

The UI displayed through the display device 120 may display a UI including a first object list including an object indicating at least one device in which a specific condition is set among the plurality of devices and a second object list including an object indicating at least one device which may provide an alarm in response to the specific condition being satisfied. Detailed description of the UI will be made with reference to FIGS. 3A and 3B.

Figure 3A:
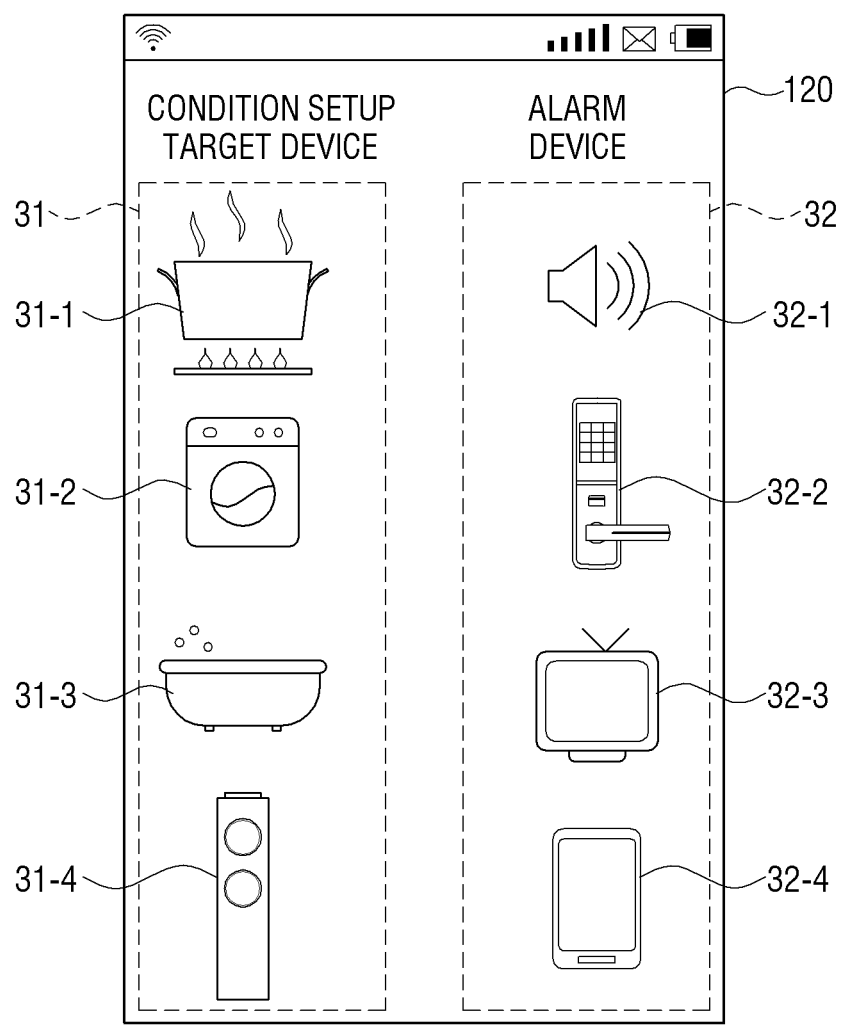
FIGS. 3A and 3B are diagrams illustrating user interface screens for controlling a plurality of devices according to an embodiment of the present disclosure.

FIG. 3A is a diagram illustrating a UI screen for controlling a plurality of devices according to an embodiment of the present disclosure.

Referring to FIG. 3A, a UI screen displayed in the display device 120 may be provided from an application or program for controlling the plurality of devices. The UI screen may include a first object list 31 which may select a condition setup target device in which a specific condition is to be set and a second object list 32 which may select an alarm device which may provide an alarm according to the satisfaction of the specific condition.

Referring to FIG. 3A, the first object list 31 may include an object 31-1 indicating the cooker 11, such as a gas range or an electronic microwave oven, an object 31-2 indicating the washing machine 13, an object 31-3 indicating the bathtub 14, an object 31-4 indicating the air conditioner 17, and the like.

Referring to FIG. 3A, the second object list 32 may include an object 32-1 indicating the speaker 18, an object 32-2 indicating the door lock 12, an object 32-3 indicating the TV 15, an object 32-4 indicating the smart phone 16, and the like.

The user may select the cooker 11 as the condition setup target device by selecting the object 31-1 indicating the cooker 11. Similarly, the user may select the devices corresponding to the objects 31-2 to 31-4 as the condition setup target device by selecting the objects 31-2 to 31-4.

The user may select the speaker 18 as the alarm device by selecting the object 32-1 indicating the speaker 18. Similarly, the user may select the devices corresponding to the objects 32-2 to 32-4 as the alarm device by selecting the objects 32-2 to 32-4.

In response to an object from the first object list 31 and an object from the second object list 32 being selected by the user and then a specific condition set in a device corresponding to the object selected from the first object list 31 being satisfied, a device corresponding to the object selected from the second object list 32 may output an alarm.

The term "specific condition" may refer to a state condition of the condition setup target device or the user terminal apparatus 100 which allows the alarm device to provide the alarm. For example, in response to selecting the object 31-1 indicating the cooker 11 by the user, the specific condition set to the cooker 11 may be a state that a preset time elapsed from a turn-on time of the cooker 11. In this example, a state that 30 minutes elapsed from the turn-on time of the cooker 11 may be set as the specific condition for providing the alarm from the alarm device linked to the cooker 11. In response to 30 minutes being elapsed from the turn-on time of the cooker 11, the alarm device linked to the cooker 11 may provide the alarm suitable for the characteristic of the corresponding alarm device in order for the user to pay attention.

The specific condition may be autonomously set in the condition setup target device and the alarm device, but the specific condition may be directly set or modified through the user terminal apparatus 100 by the user.

The specific condition may be a linked operation between the condition setup target device and another device including the alarm device. For example, the cooker 11 may be linked with the door lock 12 installed in a front door. In this example, in response to the door lock 12 being unlocked in an inner side of the front door in a state that the cooker 11 is turned on, an alarm sound such as an alert sound may be output from the door lock 12, and thus the user may recognize that the cooker 11 is turned on. The alarm sound may be output in a voice alert form such as "The cooker is turned on". Accordingly, an accident such as a fire, which may occur while the user goes out and leaves the cooker 11 is turned on, may be prevented.

The specific condition set to the device may be different according to the characteristic of the device. For example, the specific condition set to the washing machine 13 may be a washing completion state, a state that a preset time elapsed in a state that laundry is not collected after the washing completion, a specific operation of another device linked to the washing machine 13 in a state that the laundry is not collected, and the like. The specific condition set to the bathtub 14 may be a state that a temperature of water in the bathtub 14 reaches a preset temperature, a state that the water of the bathtub 14 rises to a preset height, and the like.

The device in which the specific condition may be set may be automatically searched for through the user terminal apparatus 100 and may be automatically listed in the first object list 31. The device which may provide the alarm to the user through various methods such as a sound or screen may be automatically searched for and may be automatically listed in the second object list 32. The condition setup target device and the alarm device may be manually added by the user.

Among the devices listed up in the first object list 31, a device which requires the user's special attention may be preferentially displayed. For example, since the fire is likely to occur in the cooker 11 using fire due to carelessness, the cooker 11 may be the device which requires the user's high attention. Accordingly, the device such as the cooker 11 having a high risk may be displayed in the top of the first object list 31. The devices having a relatively low risk as next ranks may be sequentially displayed downwards in the first object list 31. For this reason, the processor 130 determines a pre-set priority for devices corresponding to a plurality of objects included in the first object list 31, and controls the display device to display information for the devices corresponding to the plurality of objects in a high priority order.

Figure 3B:
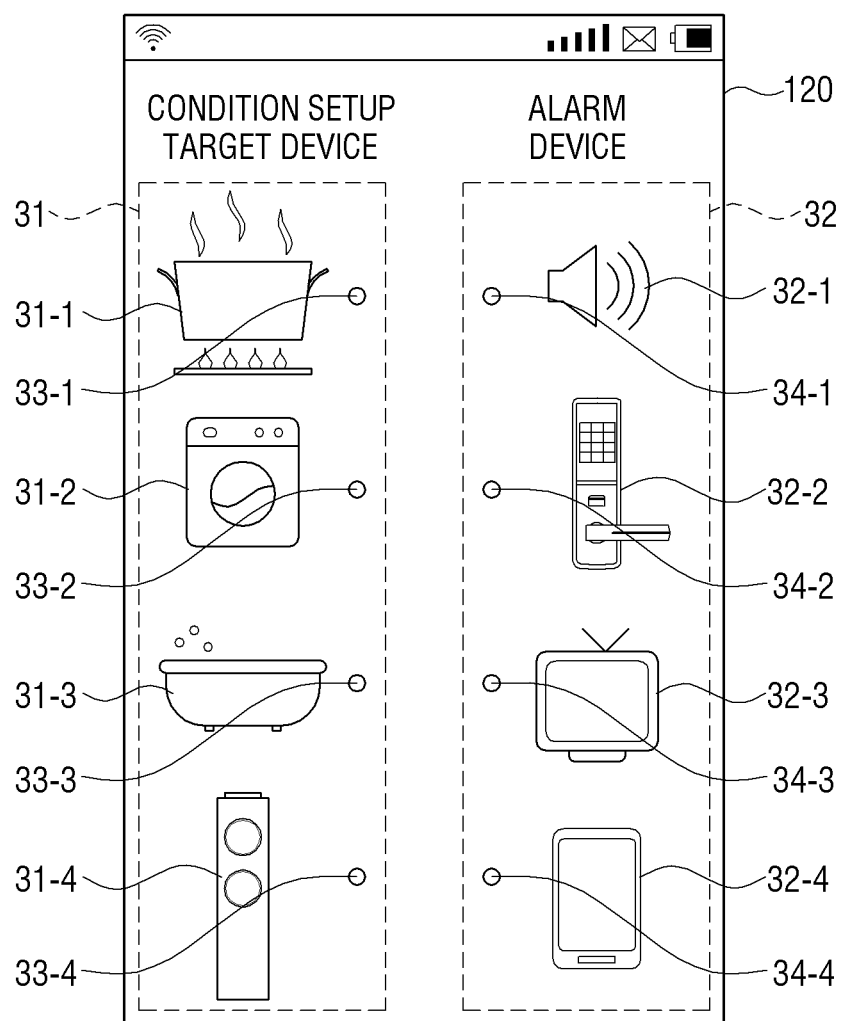

FIG. 3B is a diagram illustrating a UI screen for controlling a plurality of devices according to an embodiment of the present disclosure.

Referring to FIG. 3B, connection points 33-1 to 33-4 and 34-1 to 34-4 which mutually couple the objects indicating the condition setup target devices and the objects indicating the alarm devices may be further displayed in inner sides or outer sides of the objects included in the first object list 31 and the second object list 32.

The connection points 33-1 to 33-4 corresponding to the objects included in the first object list 31 may be displayed in right sides of the objects corresponding thereto and the connection points 34-1 to 34-4 corresponding to the objects included in the second object list 32 may be displayed in left sides of the objects corresponding thereto.

The processor 130 may be configured to control an overall operation of the user terminal apparatus 100.

In response to the objects being selected from the first object list 31 and the second object list 32 through the UI, the processor 130 may control the devices corresponding to the objects selected from the first object list 31 and the second object list 32 so that the device corresponding to the object selected from the second object list 32 may be set as a device which provides an alarm according to the satisfaction of the specific condition set to the device corresponding to the object selected from the first object list 31.

For example, in response to the objects being selected from the first object list 31 and the second object list 32, the processor 130 may control a control signal, which sets a signal according to the satisfaction of the specific condition to be transmitted to the device corresponding to the object selected from the second object list 32, to be transmitted to the device corresponding to the object selected from the first object list. In response to the signal according to the satisfaction of the specific condition from the device corresponding to the object selected from the first object list 31 being received in the device corresponding to the object selected from the second object list 32, the processor 130 may control a control signal, which sets the alarm according to the satisfaction of the specific condition to be provided, to be transmitted to the device indicating the object selected from the second object list 32.

Hereinafter, for clarity, the device corresponding to the object included in the first object list 31 may refer to the condition setup target device and the device corresponding to the object included in the second object list 32 may refer to the alarm device.

In response to the condition setup target device selected from the first object list 31 being satisfied with the specific condition, the processor 130 may directly transmit the signal according to the satisfaction of the specific condition to the alarm device selected from the second object list 32 not via the user terminal apparatus 100. The signal according to the satisfaction of the specific condition may be transmitted through the AP 200.

Hereinafter, the devices indicating the object selected from the first object list 31 and the object selected from the second object list 32 may refer to devices that "the relationship was established". The operation for selecting the objects from the first object list 31 and the second object list 32 may refer to an operation which "establish the relationship" between the devices indicating the selected objects.

In response to a touch and drag being performed from a region in which the object included in the first object list 31 is located to a region in which the object included in the second object list 32 is located, the processor 130 may select the devices indicating the object included in the first object list 31 and the object included in the second object list 32. The process of selecting the devices will be described in detail with reference to FIGS. 4A and 4B.

Figure 4A:
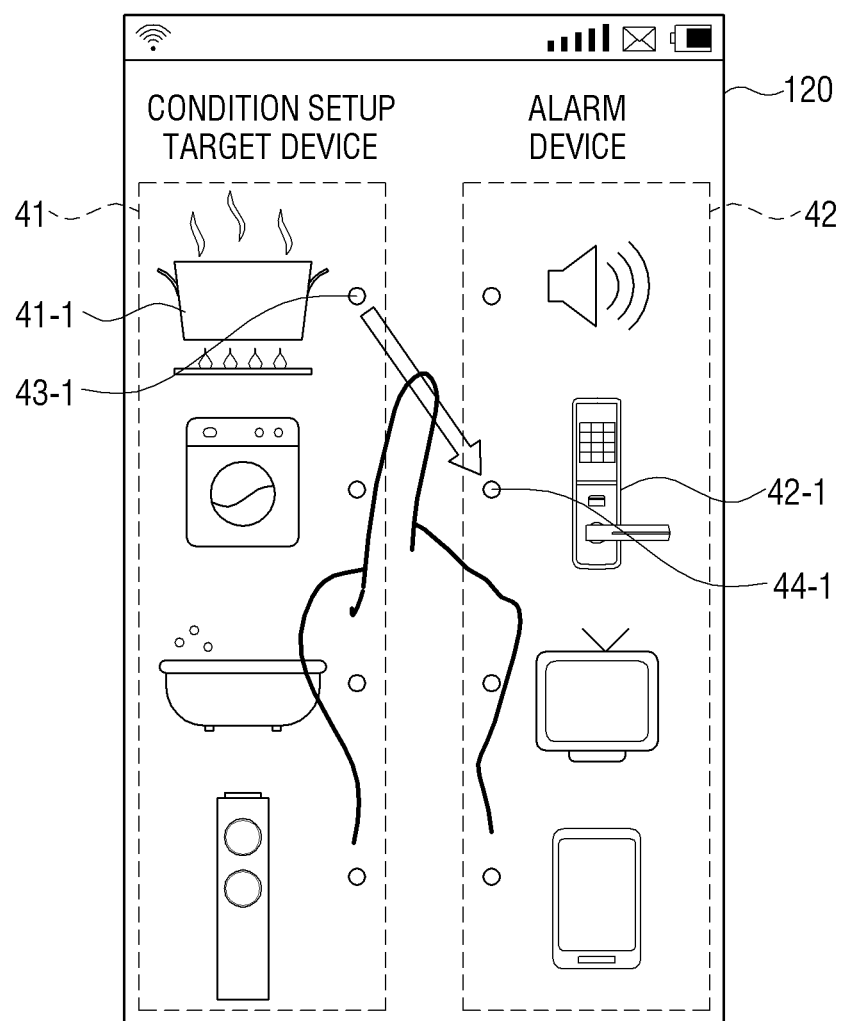
FIGS. 4A and 4B are diagrams illustrating a method of selecting a device for setting a connection relationship according to an embodiment of the present disclosure.
Figure 4B:
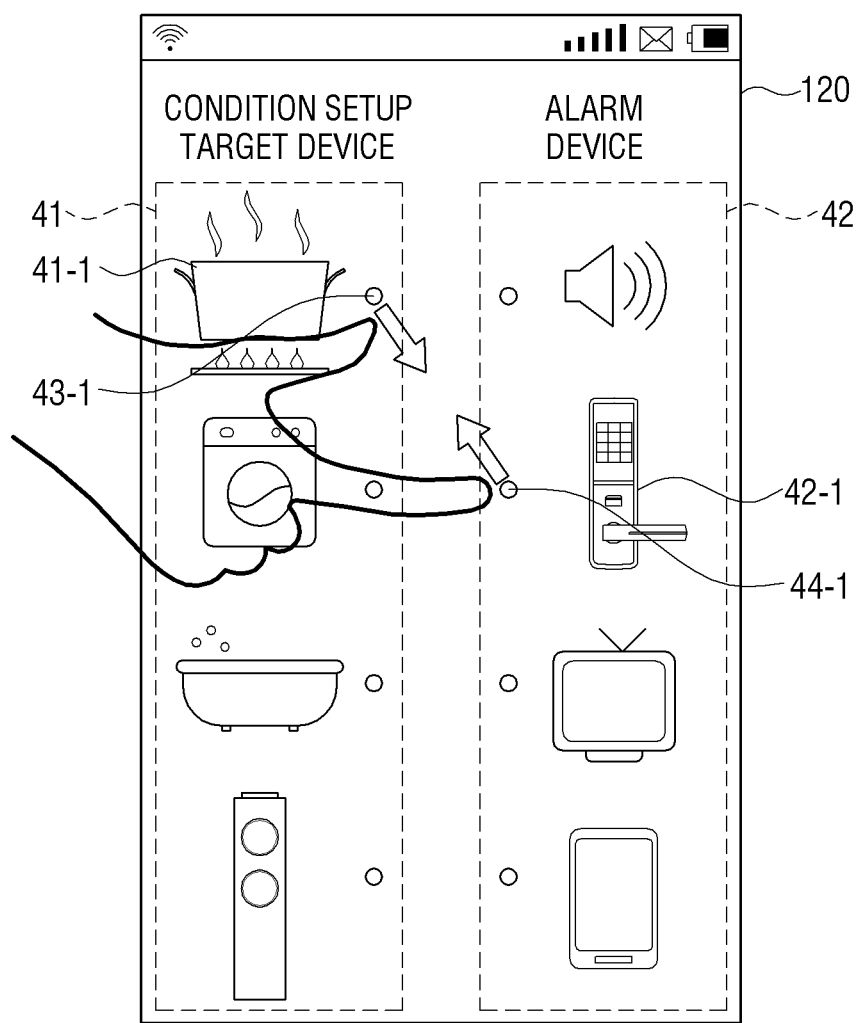

FIGS. 4A and 4B are diagrams illustrating a method of selecting devices for setting a connection relationship according to an embodiment of the present disclosure.

Referring to FIG. 4A, the user may establish the relationship between the cooker 11 and the door lock 12 by performing a touch and drag operation which drags a connection point 43-1 corresponding to an object 41-1 indicating the cooker 11 among objects included in a first object list 41 to a connection point 44-1 corresponding to an object 42-1 indicating the door lock 12 among objects included in a second object list 42 by touching the connection point 43-1. In response to the relationship between the cooker 11 and the door lock 12 being established, the user may set the specific condition that the door lock 12 may provide the alarm according to the operation of the cooker 11. For example, in response to the door lock 12 being unlocked in the inner side of the front door while the cooker 11 operates in the turn-on state, the alert sound may be output through a speaker provided in the door lock 12. That is, in response to the condition that the door lock 12 is unlocked in the inner side of the front door and the cooker 11 is in the turn-on state is satisfied, the processor 130 may control a control signal, which sets a signal according to the satisfaction of the specific condition to be transmitted to the door lock 12, to be transmitted to the cooker 11 and in response to the signal being received in the door lock 12, the processor 130 may control a control signal, which sets the alarm to be provided, to be transmitted to the door lock 12.

The touch operation for coupling the objects using a finger touch may be performed through various methods including multi touches other than the touch and drag. Referring to FIG. 4B, the user may establish the relationship between the cooker 11 and the door lock 12 by performing a pinch gesture by touching the connection point 43-1 corresponding to the object 41-1 indicating the cooker 11 included in the first object list 41 and the connection point 44-1 corresponding to the object 42-1 indicating the door lock 12 included in the second object list 42 using two fingers.

Figure 5:
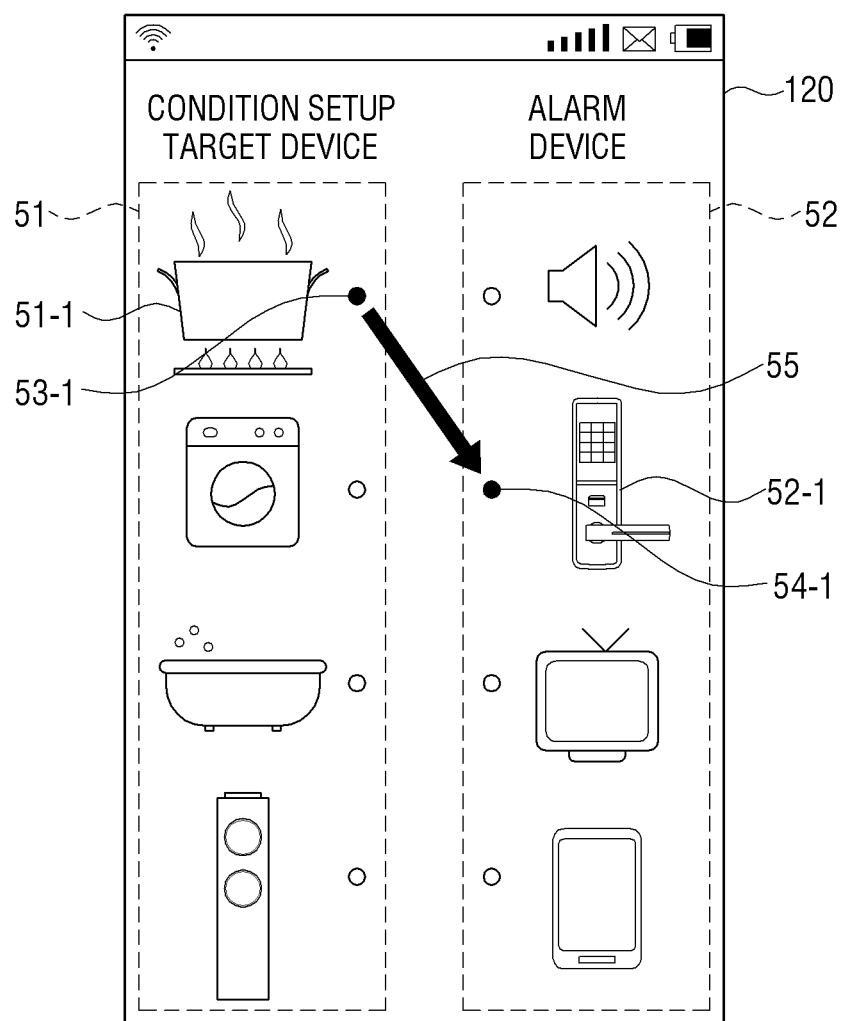
FIGS. 5, 6, and 7 are diagrams illustrating user interface screens that a connection relationship is set according to various embodiments of the present disclosure.
Figure 6:
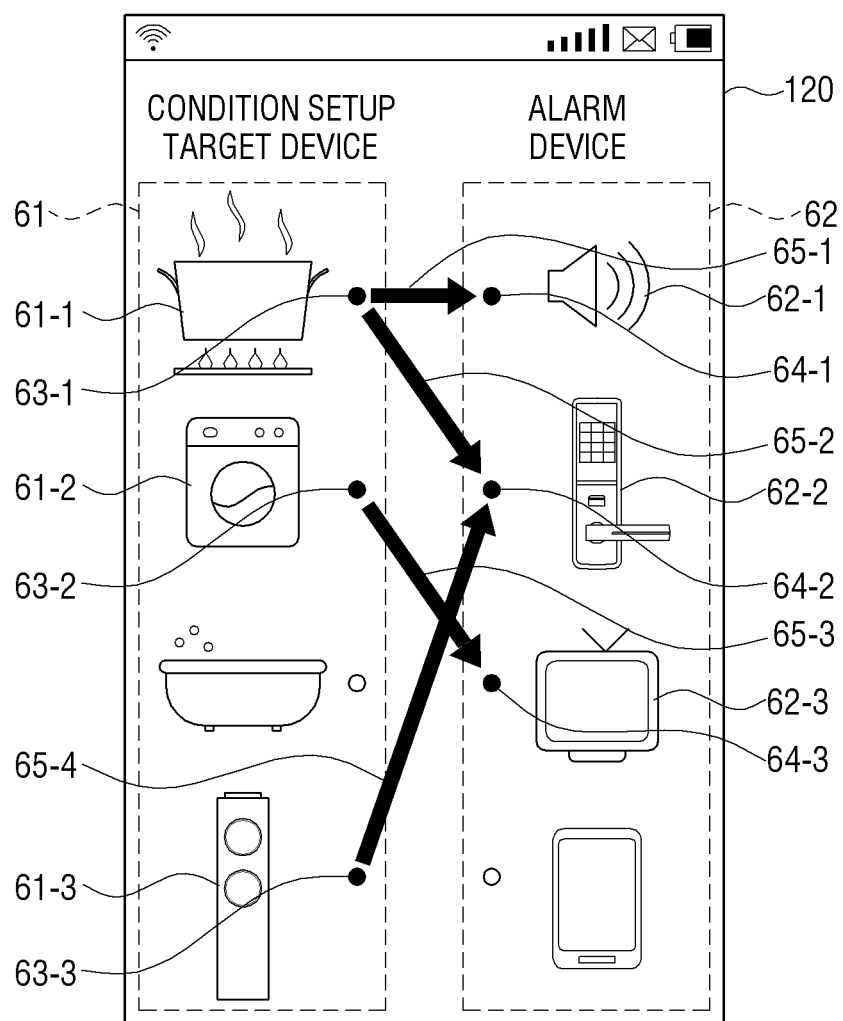
Figure 7:
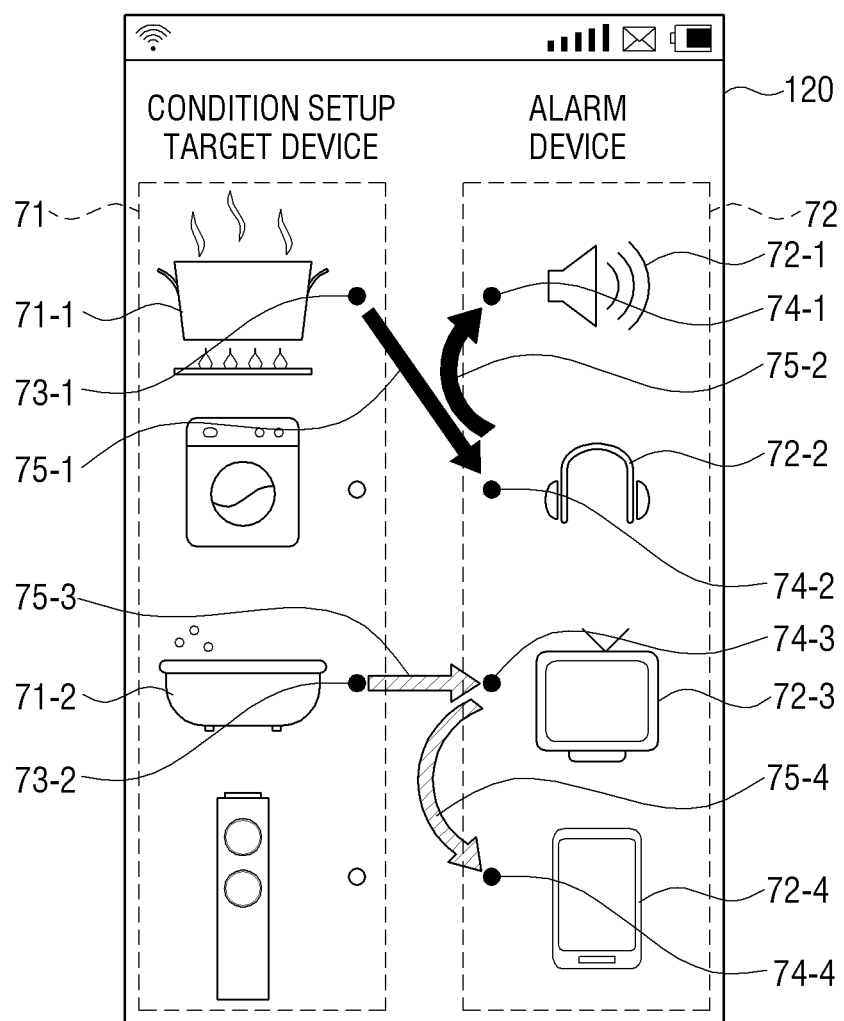

FIGS. 5, 6, and 7 are diagrams illustrating UI screens in which a connection relationship is set according to various embodiments of the present disclosure.

In response to objects being selected from a first object list 51 and a second object list 52, the processor 130 may control a graphic UI (GUI) to illustrate that devices corresponding to the selected objects are coupled to each other in a state that the first object list 51 and the second object list 52 are simultaneously displayed.

FIG. 5 illustrates a GUI indicating the relationship establishment between devices according to an embodiment of the present disclosure.

Referring to FIG. 5, a GUI 55 may be represented with a coupling indicator which illustrates a coupling of the selected objects 51-1 and 52-1. The coupling indicator may be represented in a form of an arrow, as illustrated in FIG. 5. Connection points 53-1 and 54-1 corresponding to objects in which the connections are accomplished may be differently displayed from other connection points corresponding to objects in which the connections are accomplished.

FIG. 6 illustrates a GUI indicating the relationship establishment between devices according to an embodiment of the present disclosure. The relationship of a condition setup target device with a plurality of alarm devices may be established.

For example, referring to FIG. 6, a GUI 65-1 illustrates a coupling of a connection point 63-1 corresponding to an object 61-1 indicating the cooker 11 in a first object list 61 to a connection point 64-1 corresponding to an object 62-1 indicating the speaker 18 in a second object list 62. Furthermore, a GUI 65-2 illustrates a coupling of the connection point 63-1 to a connection point 64-2 corresponding to an object 62-2 indicating the door lock 12 in the second object list 62. In response to the specific condition set to the cooker 11 being satisfied, the alarm sound may be output through the speaker 18 and the door lock 12. The alarm sound may be simultaneously output from the speaker 18 and the door lock 12 or may be sequentially output from the speaker 18 and the door lock 12 according to a preset priority. For example, the user may establish the relationship by firstly selecting an object indicating the door lock 12 and establish the relationship by secondly selecting an object indicating the speaker 18. In this example, the alarm sound may be firstly output from the door lock 12, and then the alarm sound may be output from the speaker 18 after a preset time elapsed after the first alarm sound is output.

The relationship of the alarm device with the plurality of condition setup target devices may be established. Furthermore, a GUI 65-4 illustrates a coupling of a connection point 63-3 corresponding to an object 61-3 indicating the air conditioner 17 in the first object list 61 to the connection point 64-2 corresponding to the object 62-2 indicating the door lock 12 in the second object list 62. Thus, in response to the specific condition set to the cooker 11 or the specific condition set to the air conditioner 17 being satisfied, the alarm sound may be output through the door lock 12. For example, in response to the state that the door lock 12 is unlocked in the inner side of the front door during an operation of the air conditioner 17 being set to the specific condition, the processor 130 may transmit the control signals, which allow the alarm sound "Turn off the air conditioner and go out" to be output from the door lock 12, to the air conditioner 17 and the door lock 12 according to the connection between the objects in response to the door lock 12 being unlocked in the inner side of the front door during the operation of the air conditioner 17.

As described above, the user may redundantly variously couple the plurality of objects indicating the plurality of devices in the first object list 61 and the plurality of objects indicating the devices in the second object list 62.

In response to the alarm device being a device which may provide visual information, the alarm may be provided in a visual form. For example, GUI 65-3 illustrates a relationship between the washing machine 13 and the TV 15 by illustrating a coupling of a connection point 63-2 corresponding to an object 61-2 indicating the washing machine 13 in the first object list 61 and a connection point 64-3 corresponding to an object 62-3 indicating the TV 15 in the second object list 62. In response to the specific condition set to the washing machine 13 being "washing completion", information indicating that the washing is completed may be provided through a screen displayed in the TV 15 in response to the washing being completed. For example, the information indicating that the washing is completed may be provided in a message form displayed in one side of the TV screen to minimize viewing disturbance of content displayed in the TV 15.

FIG. 7 is a diagram illustrating a relay transmission method of a signal between alarm devices according to an embodiment of the present disclosure.

The alarm device may relay-transmit the signal received according to the satisfaction of the specific condition to another alarm device. For example, referring to FIG. 7, the user may establish the relationship, illustrated by GUI 75-1, between the cooker 11 and a headphone by coupling a connection point 73-1 corresponding to an object 71-1 indicating the cooker 11 in a first object list 71 and a connection point 74-2 corresponding to an object 72-2 indicating the headphone in the second object list 72. Accordingly, for example, in response to 20 minutes being elapsed after the cooker 11 is turned on according to the preset specific condition, the alarm sound may be output through the headphone.

However, when the headphone in a power-off state or when the user takes off the headphone for a moment, the user may not hear the alarm sound. Accordingly, the user may select a secondary alarm device which is to secondarily provide the alarm sound. The processor 130 may set a signal according to the satisfaction of the preset specific condition received in the headphone from the cooker 11 or the AP 200 to be relay-transmitted to the secondary alarm device and the secondary alarm device may further provide the alarm according to the signal.

Referring to FIG. 7, in response to a touch and drag being performed from a region in which the object 72-2 indicating the headphone is located to a region in which an object 72-1 indicating the speaker 18 is located, after the relationship between the cooker 11 and the headphone is established or in a state that a touch and drag is performed from a region in which the object 71-1 indicating the cooker 11 is located to the region in which the object 72-2 indicating the headphone is located, the relationship from the headphone to the speaker 18 may be additionally established. The processor 130 may control a GUI 75-2 to indicate that the relay relationship between the headphone and the speaker 18 is established. In particular, the GUI 75-2 may illustrate a coupling between the connection point 74-2 corresponding to the object 72-2 indicating the headphone and a connection point 74-1 corresponding to the object 72-1 indicating the speaker 18. The headphone may then relay-transmit the received signal to the speaker 18 according to the setup of the relay relationship.

In another example, the user may establish a relationship between the bathtub 14 and the TV 15, illustrated by GUI 75-3, by coupling a connection point 73-2 corresponding to an object 71-2 indicating the bathtub 14 in the first object list 71 and a connection point 74-3 corresponding to an object 72-3 indicating the TV 15 in the second object list 72, and the alarm may be provided through the TV 15 in response to water in the bathtub 14 rising to a preset height according to the preset specific condition. For example, the processor 130 may detect whether or not the water in the bathtub 14 rises to the preset height using a weight sensor and transmit a signal for informing the satisfaction of the preset condition to the TV 15 in response to the water being determined to rise to the preset height. In response to the signal for informing the satisfaction of the preset condition being received, the TV 15 may provide alarm information based on a visual or auditory sense.

However, to provide the alarm through another alarm device in a state that the alarm cannot be provided through the TV 15 such as when the TV 15 s in a turn-off state, the user may select a secondary alarm device configured to provide a secondary alarm sound.

The processor 130 may set the user terminal apparatus 100 to transmit a signal according to the satisfaction of the preset specific condition received from the bathtub 14 or the AP 200 to the secondary alarm device and the secondary alarm device may additionally provide the alarm according to the signal.

Referring to FIG. 7, in response to a touch and drag being performed from a region in which the object 72-3 indicating the TV 15 is located to a region in which an object 72-4 indicating the user terminal apparatus 100 is located after the relationship between the bathtub 14 and the TV 15 is established or in a state that a touch and drag is performed from a region in which the object 71-2 indicating the bathtub 14 is located to the region in which the object 72-3 indicating the TV 15 is located, the relationship from the TV 15 to the user terminal apparatus 100 may be additionally established. The processor 130 may control a GUI 75-4 to indicate that the relay relationship between the TV 15 and the user terminal apparatus 100 is established. In particular, the GUI 75-4 may illustrate a coupling between the connection point 74-3 corresponding to the object 72-3 indicating the TV 15 and a connection point 74-4 corresponding to the object 72-4 indicating the user terminal apparatus 100. The TV 15 may relay-transmit the received signal to the user terminal apparatus 100 according to the setup of the relay relationship.

Figure 8:
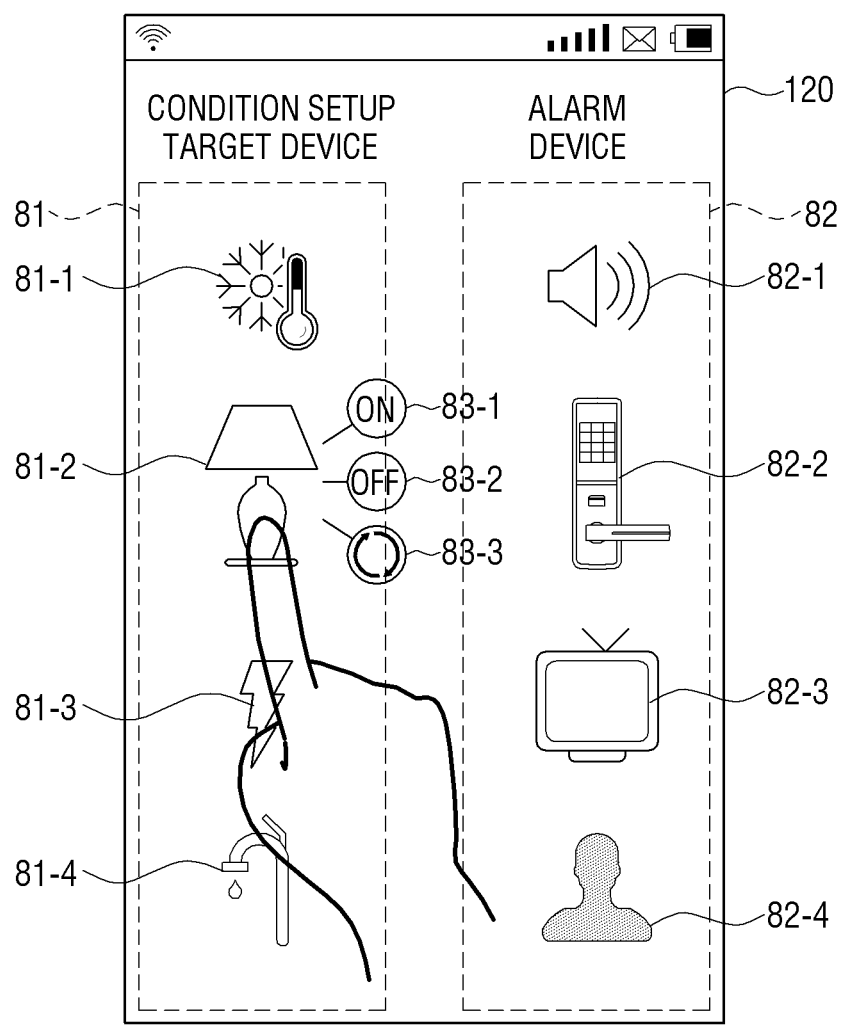
FIGS. 8, 9, and 10 are diagrams illustrating menus for setting a condition according to various embodiments of the present disclosure.
Figure 9:
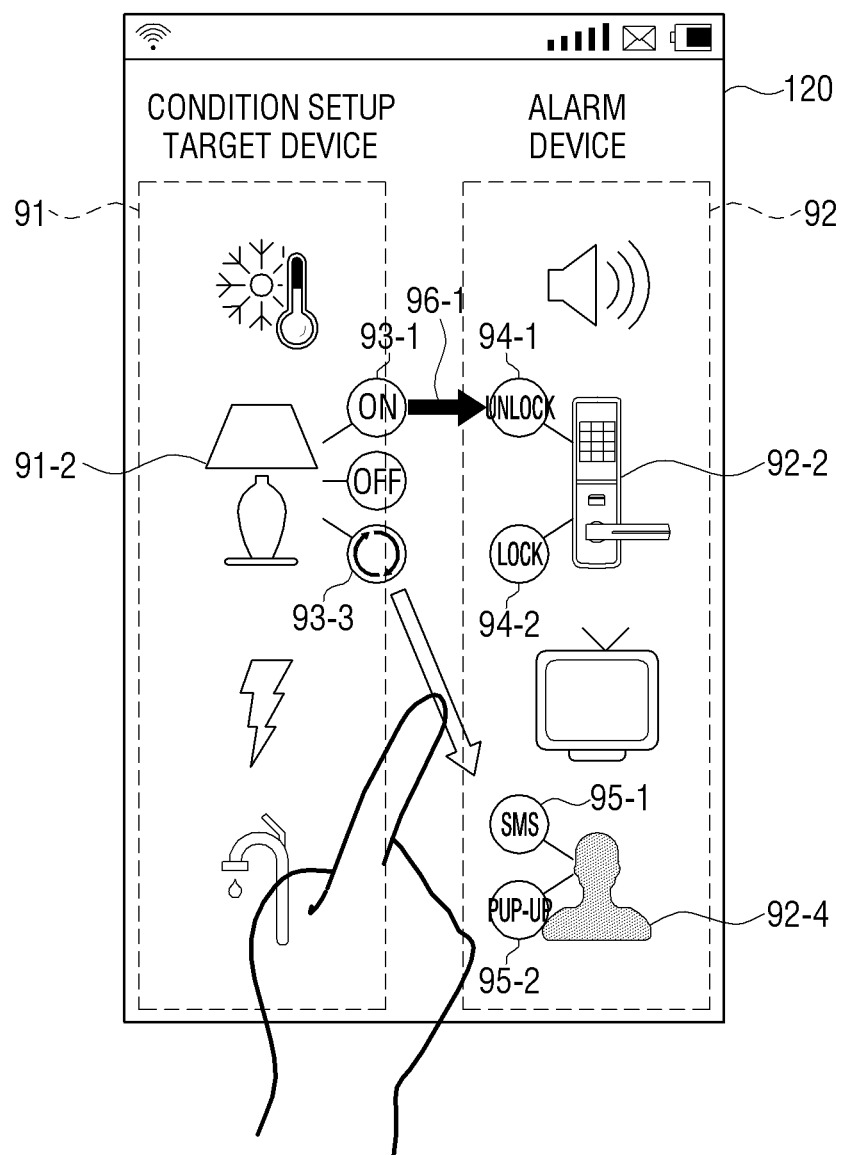
Figure 10:
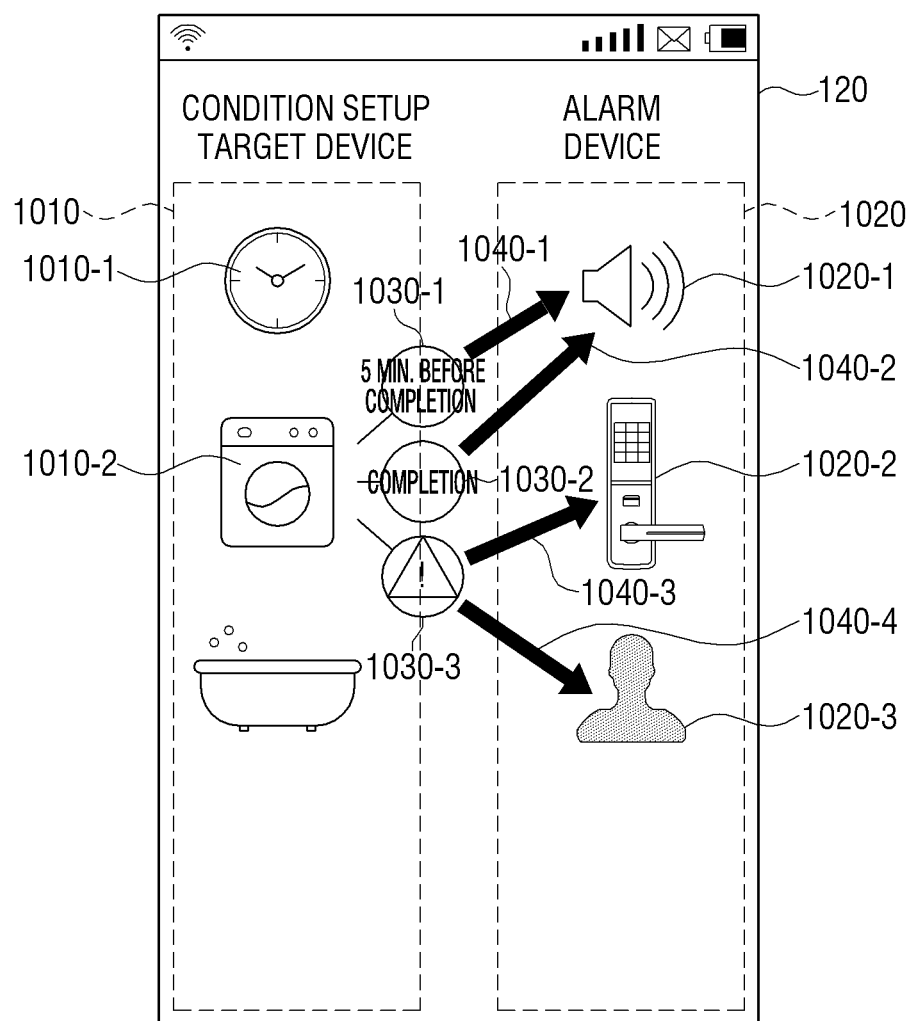

FIGS. 8, 9, and 10 are diagrams illustrating menus for setting a condition according to various embodiments of the present disclosure.

Referring to FIG. 8, the user may set the alarm condition for the condition setup target device in a UI screen. The menu for setting the alarm condition may be represented through the selection of the condition setup target device.

For example, in response to an object indicating a device in a first object list being touched by the user, the menu for selecting the alarm condition may be displayed around the object and in response to the alarm condition being touched in the displayed menu and then dragged to a region in which an object indicating the alarm device is located by the user, the alarm condition may be selected and simultaneously the relationship between the corresponding condition setup target device and the alarm device may be established.

For example, as illustrated in FIG. 8, in response to an object 81-2 indicating a lamp in a first object list 81 being selected by the user, a menu which may select at least one of a turn-on condition 83-1 of the lamp, a turn-off condition 83-2 of the lamp, and a condition 83-3 that the lamp reaches the end of life may be displayed in the right of the corresponding object 81-2. The user may establish the relationship between the condition setup target device and the alarm device by selecting at least one of the conditions 83-1 to 83-3 included in the menu and coupling the selected condition to a region in which at least one of objects 82-1 to 82-4 indicating the alarm devices in a second object list 82 is located. In this example, in response to the condition selected from the menu by the user being satisfied, the processor 130 may transmit control signals to the selected condition setup target device and alarm device so that the alarm is provided through the alarm device that the relationship is established.

In another example, in response to an object 81-1 indicating a thermometer being selected by the user, a menu which may select at least one of a condition that room temperature is equal to or larger than a preset temperature and a condition that the room temperature is less than the preset temperature may be displayed. The relationship between the thermometer and the TV 15 may be established in response to any one of the conditions being selected in the corresponding menu and being coupled to the object 82-3 indicating the TV 15 of the alarm devices (through an operation such as touch and drag) by the user. In response to the room temperature being reduced below the preset temperature or increased above the preset temperature according to the condition selected by the user, the processor 130 may transmit control signals to the thermometer and the TV 15 so that the alarm may be provided through the TV.

In another example, in response to an object 81-3 indicating a voltmeter being selected by the user, a menu which may set electricity usage in home for providing the alarm may be displayed. For example, the menu which may select at least one of a condition that the electricity usage reaches 1000 kwh, a condition that the electricity usage reaches 1500 kwh, and a condition that the electricity usage reaches 2000 kwh may be displayed. The value of the electricity usage displayed in the menu may be variously changed by the user. In response to any one condition being selected in the corresponding menu and coupled to an object indicating any one of the alarm devices by the user, the relationship between the voltmeter and the corresponding alarm device may be established. In response to the electricity usage in home reaching a preset amount of power according to the condition selected by the user, the processor 130 may transmit control signals to the voltmeter and the alarm device that the relationship with the voltmeter is established so that the alarm may be provided through the alarm device that the relationship with the voltmeter is established.

In another example, in response to an object 81-4 indicating a water meter being selected by the user, a menu which may set water usage for providing the alarm in home may be displayed. For example, a menu which may select any one of a condition that the water usage reaches 5 tons, a condition that the water usage reaches 10 tons, and a condition that the water usage reaches 15 tons may be displayed. The value of the water usage displayed in the menu may be variously change by the user.

FIG. 9 is a diagram illustrating a menu which sets an operation of an alarm device according to an embodiment of the present disclosure.

In response to any one condition being selected from a condition setup menu for the condition setup target device and coupled to a region in which any one of objects indicating the alarm devices is located by the user, a menu which may select an operation of the coupled alarm device according to the satisfaction of the specific condition may be displayed around the object indicating the corresponding alarm device.

For example, referring to FIG. 9, in response to a menu 93-3 indicating the condition that the lamp reaches the end of life in the menu which may select the condition for an object 91-2 indicating the lamp in a first object list 91 being touched and then dragged to a region in which an object 92-4 indicating another user having a user terminal apparatus (a smart phone and the like) in a second object list 92 is located by the user, menus 95-1 and 95-2 which may select whether to provide an alarm in a short message service (SMS) manner or not in a pop-up message manner may be displayed around the corresponding object 92-4. In response to the alarm menu 95-1 of the SMS manner being selected from the corresponding menus 95-1 and 95-2 by the user, a GUI which couples the menu 93-3 indicating the condition that the lamp reaches the end of life and the alarm menu 95-1 of the SMS manner may be displayed.

In response to the lamp reaching the end of life, the lamp may inform the user terminal apparatus of the other user (for example, father) of replacement of the lamp by transmitting an SMS-based message to the user terminal apparatus of the other user. The lamp may directly transmit the message to the user terminal apparatus of the other user or may transmit the message to the user terminal apparatus of the other user through an external server which may generate a message and transmit the message.

In response to the menu 93-1 indicating the turn-on condition of the lamp being touched in the menu which may select the condition for the object 91-2 indicating the lamp in the first object list 91 and then dragged to a region in which an object 92-2 indicating the door lock 12 in the second object list 92 is located by the user, a unlock menu 94-1 and a lock menu 94-2 which may select whether to unlock the door lock or not to lock the door lock may be displayed around the corresponding object 92-2. In response to the unlock menu 94-1 of the corresponding menus 94-1 and 94-2 being selected by the user, a GUI 96-1 which couples the menu 93-1 indicating the turn-on condition of the lamp to the unlock menu 94-1 of the door lock may be displayed. The GUI 96-1 may be implemented with a coupling indicator illustrating a coupling of the selected menus to each other. The coupling indicator may be represented with various forms such as an arrow as illustrated in FIG. 9.

FIG. 10 illustrates a screen that a relationship between a condition setup target device and an alarm device is established and the condition is set according to an embodiment of the present disclosure.

Referring to FIG. 10, an alarm may be provided through different alarm devices according to a condition for the washing machine. For example, while the washing is performed in the washing machine 13, the processor 130 may control the alarm sound to be output through the speaker 18 in 5 minutes before washing completion and in the washing completion. In response to the door lock 12 being unlocked in the inner side of the front door in a state that the laundry is not collected in the washing machine 13 after the washing completion, the processor 130 may control the alarm sound or vibration to be output from the door lock 12. For example, while the alarm sound or the vibration is output from the door lock 12, an alarm in a form of SMS, social network service (SNS), or pop-up message may be simultaneously provided to a user terminal apparatus of a specific person corresponding to the object 1020-3. In another example, the operation of outputting the alarm sound or vibration from the door lock 12 or the operation of providing the message type of alarm to the user terminal apparatus may be sequentially performed, FIG. 10 illustrates a screen that relationships between the speaker 18, the door lock 12, and the user terminal apparatus of the specific person corresponding to the object 1020-3 and the washing machine 13 are established according to the condition of the washing machine 13. Between a menu 1030-1 which may select '5 minutes before completion' of an object 1010-2 indicating the washing machine 13 in a first object list 1010 as the condition and an object 1020-1 indicating the speaker 18 in a second object list 1020, a GUI 1040-1 indicating that the relationship between the washing machine 13 and the speaker 18 is established may be displayed. A GUI 1040-2 may be displayed between a menu 1030-2 which may select 'completion' as the condition and the object 1020-1 indicating the speaker 18.

Between a menu 1030-3 which may select 'unlock of the door lock in the inner side of the front door after the washing completion' as the condition and the object 1020-2 indicating the door lock 12, a GUI 1040-3 indicating that the relationship between the washing machine 13 and the door lock 12 is established may be displayed.

The condition that the alarm device provides the alarm may not be related to the condition that the operation of the specific device is satisfied. For example, the processor 130 may control an alarm device to provide the alarm in a specific time by connecting an object 1010-1 indicating a clock among the condition setup target devices and the corresponding alarm device. For example, in response to the object 1010-1 indicating the clock being touched by the user, a menu which may select the time for providing the alarm may be displayed. In response to the time being selected from the displayed menu by the user and any one of the alarm devices being selected by dragging the selected time to a region in which the object indicating the selected object is located, the relationship between the selected specific time and the selected alarm device may be established. Accordingly, the alarm may be provided at the selected time through the selected alarm device.

For example, in response to '8:00 PM' being set as an alarm time by the user and the speaker 18 being selected as the alarm device by the user, the user terminal apparatus 100 may transmit information for the set alarm time to the selected speaker 18 through the transceiver 110. The speaker 18 may store the received information for the alarm time and output the alarm sound at the alarm time using a clock chip inside the speaker 18. The user terminal apparatus 100 may transmit the information for the set alarm time and the information for a current time to the speaker 18. In response to the user terminal apparatus 100 and the speaker being coupled through the AP 200, the AP 200 may transmit the information to the speaker 18.

Figure 11:
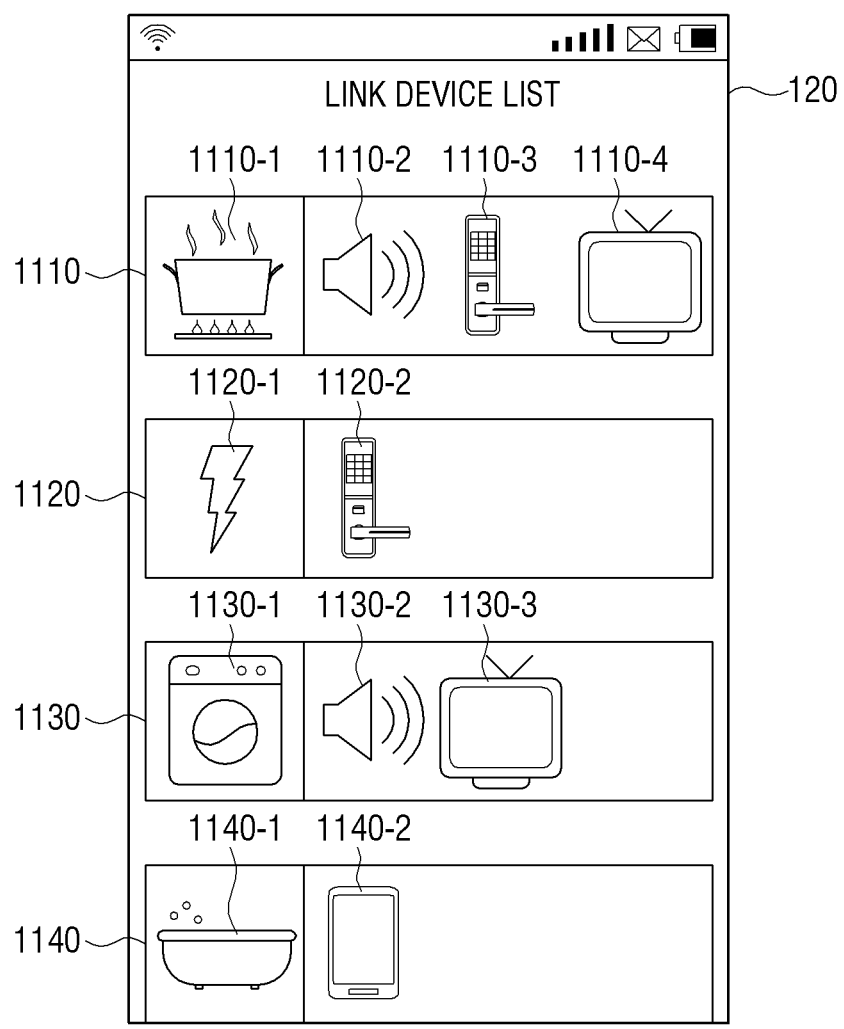
FIG. 11 is a diagram illustrating a list which stores information for a device that a connection relationship is set according to an embodiment of the present disclosure.

FIG. 11 is a diagram illustrating a list which stores information for a device that a connection relationship is set according to an embodiment of the present disclosure.

The relationship between the condition setup target device and the alarm device may be managed in another UI screen in a list form. For example, the processor 130 may store connection information between a device corresponding to an object selected from a first object list and a device selected from a second object list as a device configured to provide the alarm according to the satisfaction of the specific condition in a separate list form.

Referring to FIG. 11, in response to one device among the condition setup target devices being the cooker 11 and the alarm device that the relationship is established with the cooker 11 being the speaker 18, the door lock 12, and the TV 15, the processor 130 may provide a list in a form of box 1110 including an object 1110-1 indicating the cooker 11, an object 1110-2 indicating the speaker 18, an object 1110-3 indicating a door lock 12, and an object 1110-4 indicating the TV 15. The condition setup target device and the alarm device may be separately displayed from each other.

In response to the one device among the condition setup target devices being the voltmeter and the alarm device that the relationship is established with the voltmeter being the door lock 12, a box 1120 in which an object 1120-1 indicating the voltmeter and an object 1120-2 indicating the door lock 12 are grouped may be included in the list.

The list may further include a box 1130 in which an object 1130-1 indicating the washing machine 13 as the condition setup target device and an object 1130-2 indicating the speaker 18 and an object 1130-3 indicating the TV 15 as the alarm device are grouped. The list may further include a box 1140 in which an object 1140-1 indicating the bathtub 14 as the condition setup target device and an object 1140-2 indicating the user terminal apparatus 100 as the alarm device are grouped.

The method of providing the connection information by displaying objects in the box form as described above is merely exemplary. The method of providing the connection information is not limited thereto and the screen which may manage the devices that the relationship is established may be provided in various forms including text, an icon, and the like.

The operations may be performed through mutual direct connection after the condition is set.

Figure 12:
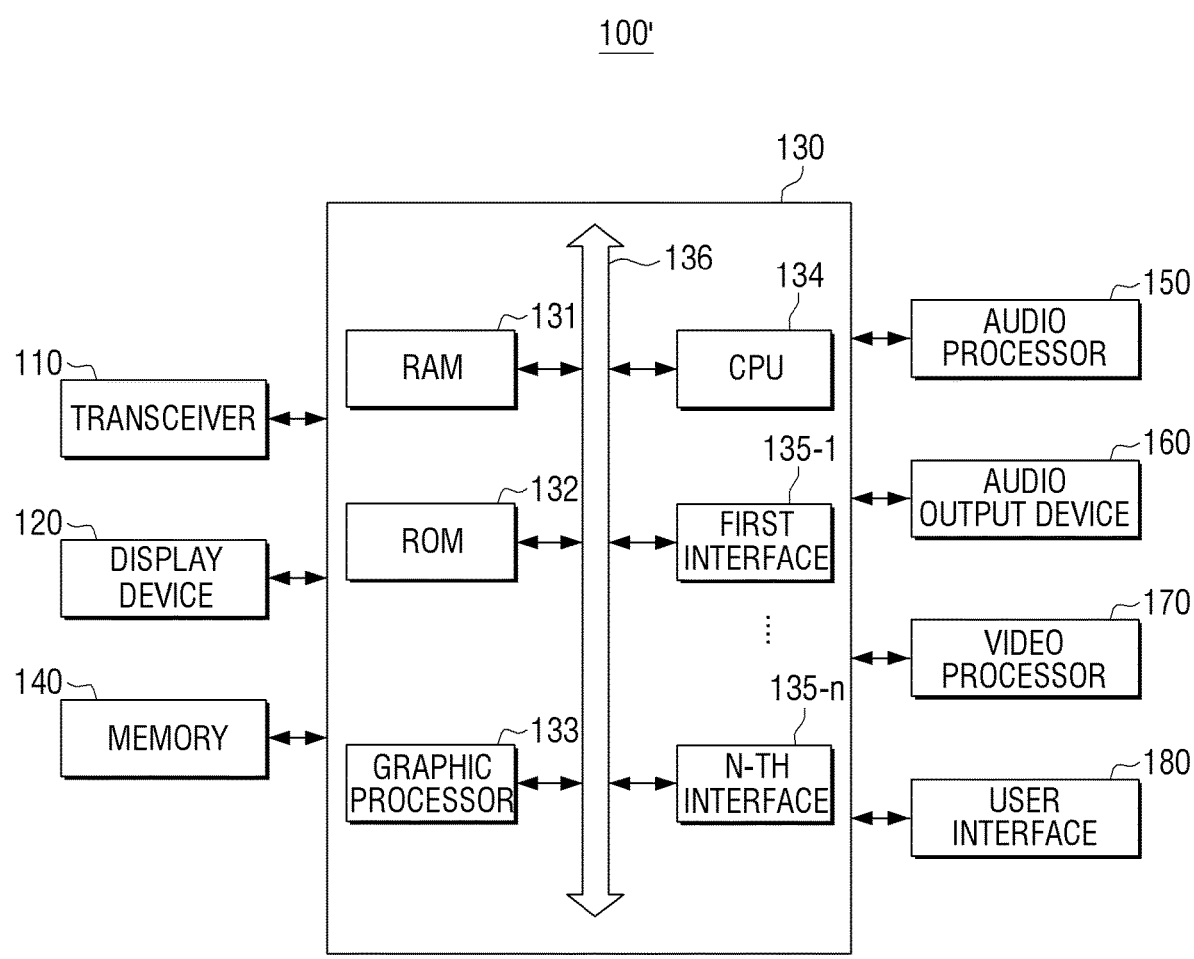
FIG. 12 is a detailed block diagram illustrating a configuration of a user terminal apparatus according to an embodiment of the present disclosure.

FIG. 12 is a detailed block diagram illustrating a configuration of a user terminal apparatus according to an embodiment of the present disclosure.

Referring to FIG. 12, the user terminal apparatus 100' according to another embodiment may include a transceiver 110, a display device 120, a processor 130, a memory 140, an audio processor 150, an audio output device 160, a video processor 170, and a UI 180. Description for a portion of the configuration of the user terminal apparatus 100' which overlaps that of the user terminal apparatus 100 of FIG. 2 will be omitted below.

The processor 130 may include a random access memory (RAM) 131, a read only memory (ROM) 132, a graphic processor 133, a central processing unit (CPU) 134, first to n-th interfaces 135-1 to 135-n, and a bus 136. The RAM 131, the ROM 132, the graphic processor 133, the CPU 134, the first to n-th interfaces 135-1 to 135-n, and the like may be electrically coupled through the bus 136.

The first to n-th interfaces 135-1 to 135-n may be coupled to the above-described components. One of the interfaces may be a network interface coupled to an external apparatus through a network.

The CPU 134 accesses the memory 140 to perform booting using an operating system (O/S) stored in the memory 140. The CPU 134 may perform various operations using a variety of programs, content, data, and the like stored in the memory 140.

A command set and the like for system booting may be stored in the ROM 132. In response to a turn-on command being input to supply power, the CPU 134 may copy the O/S stored in the memory 140 to the RAM 131 according to a command stored in the ROM 132, and execute the O/S to boot a system. In response to the booting being completed, the CPU 134 may copy various application programs stored in the memory 140 to the RAM 131, and execute the application programs copied to the RAM 131 to perform various operations.

The graphic processor 133 may be configured to generate a screen including various types of information such as an item, an image, and text using an operation unit (not shown) and a rendering unit (not shown). The operation unit (not shown) may calculate attribute values such as coordinate values, in which the various types of objects are displayed according to a layout of the screen, shapes, sizes, and colors. The rendering unit (not shown) may generate the screen having various layouts including the objects based on the attribute values calculated in the operation unit.

The operation of the processor 130 may be performed through execution of the program stored in the memory 140.

The memory 140 may store a variety of data such as an O/S software module for driving the user terminal apparatus 100' and various types of multimedia content. The detailed configuration of the memory 140 will be described with reference to FIG. 13.

Figure 13:
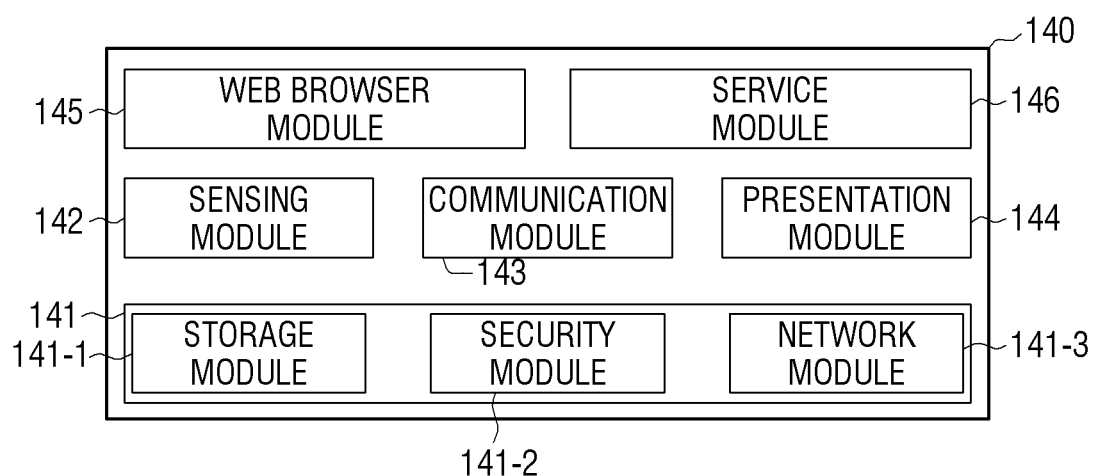
FIG. 13 is a detailed block diagram illustrating a configuration of a memory according to an embodiment of the present disclosure.

FIG. 13 is a detailed block diagram illustrating a memory according to an embodiment of the present disclosure.

Referring to FIG. 13, the memory 140 may store software including a base module 141, a sensing module 142, a communication module 143, a presentation module 144, a web browser module 145, and a service module 146.

The base module 141 may refer to a basic module configured to process signals transferred from pieces of hardware included in the user terminal apparatus 100' and transfer the processed signals to an upper layer module. The storage module 141-1 may be a program module configured to manage a database (DB) or a registry. The security module 141-2 may be a program module which supports certification, permission, secure storage, and the like for the hardware, and a network module 141-3 may be a module configured to support network connection.

The sensing module 142 may be a module which collects information from various types of sensors and analyzes and manages the collected information.

The communication module 143 may be a module which performs communication with the outside. The communication module 143 may include a messaging module and a phone module.

The presentation module 144 may be a module which forms a display screen. The presentation module 144 may include a multimedia module configured to reproduce and output multimedia content and a UI rendering module configured to perform UI and graphic processing. The processor 130 may execute the presentation module 144 to display the UI including the first object list including an object indicating the condition setup target device and the second object list including an object indicating the alarm device. The processor 130 may execute the presentation module 144 to display a GUI indicating that devices corresponding to objects selected from the first object list and the second object list are mutually connected.

The web browser module 145 may refer to a module configured to access a web server by performing web browser.

The service module 146 may be a module including various types of applications for providing a variety of service. For example, the service module 146 may include various program modules such as SNS program and content reproduction program.

Figure 14:
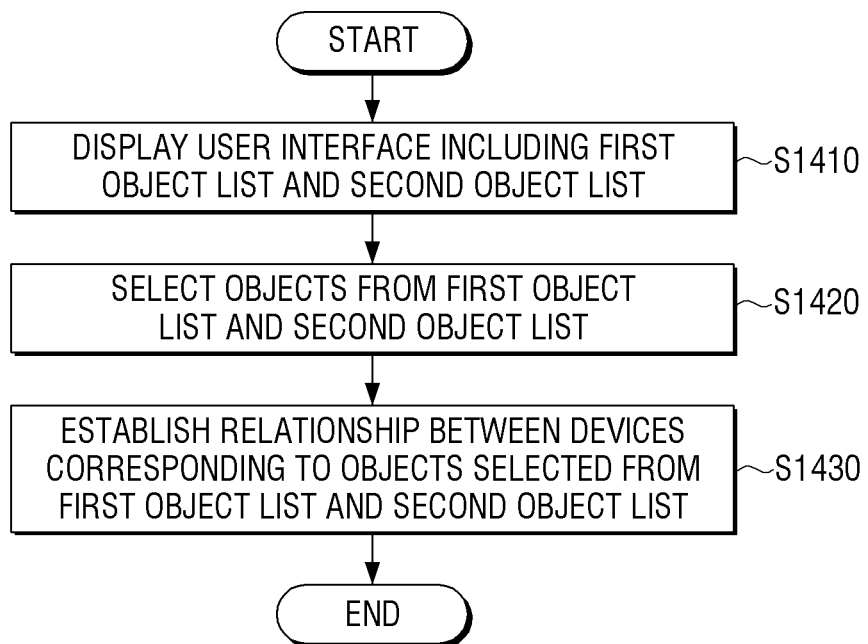
FIG. 14 is a flowchart illustrating a method of establishing a relationship between devices according to an embodiment of the present disclosure.

FIG. 14 is a flowchart illustrating a control method of a user terminal apparatus according to an embodiment of the present disclosure.

The user terminal apparatus may display a UI which includes a first object list including an object indicating at least one device in which a specific condition is set among a plurality of devices constituting the IoT environment and a second object list including an object indicating at least one device which may provide an alarm in response to the specific condition being satisfied at operation S1410.

The user terminal apparatus may select objects from the first object list and the second object list through the UI at operation S1420. In response to a touch and drag being performed from a region in which the object included in the first object list is located to a region in which the object included in the second object list is located, the user terminal apparatus may control devices corresponding to the object included in the first object list and the object included in the second object list to be selected.

The user terminal apparatus may display a menu for setting a condition around the object selected from the first object list. The user may set an alarm condition through the menu for setting the condition. The user terminal apparatus may display a menu for setting an operation for providing an alarm around the object selected from the second object list.

The user may establish a relationship between the devices corresponding to the selected objects in response to the object being selected from the first object list and the second object list at operation S1430. For example, the user terminal apparatus may control devices corresponding to the selected objects from the first object list and the second object list so that the device corresponding to the object selected from the second object list is set as a device which provides the alarm according to satisfaction of the specific condition set to the device corresponding to the object selected from the first object list.

The user terminal apparatus may control a control signal, which sets a signal according to the satisfaction of the specific condition to be transmitted to the device corresponding to the object selected from the second object list, to be transmitted to the device corresponding to the object selected from the first object list and control a control signal, which sets the alarm to be provided, to be transmitted to the device corresponding to the object selected from the second object list in response to the signal according to the satisfaction of the specific condition being received in the device corresponding to the object selected from the second object list.

In response to the objects being selected from the first object list and the second object list, the user terminal apparatus may display a GUI, which indicates that the devices corresponding to the selected objects are mutually coupled in a state that the first object list and the second object list are simultaneously displayed. The GUI may be a coupling indicator illustrating a coupling between the selected objects.

The user terminal apparatus may store connection information of the device corresponding to the object selected from the first object list and the device selected from the second object list as a device which provides the alarm according to the satisfaction of the specific condition in a list form.

Figure 15:
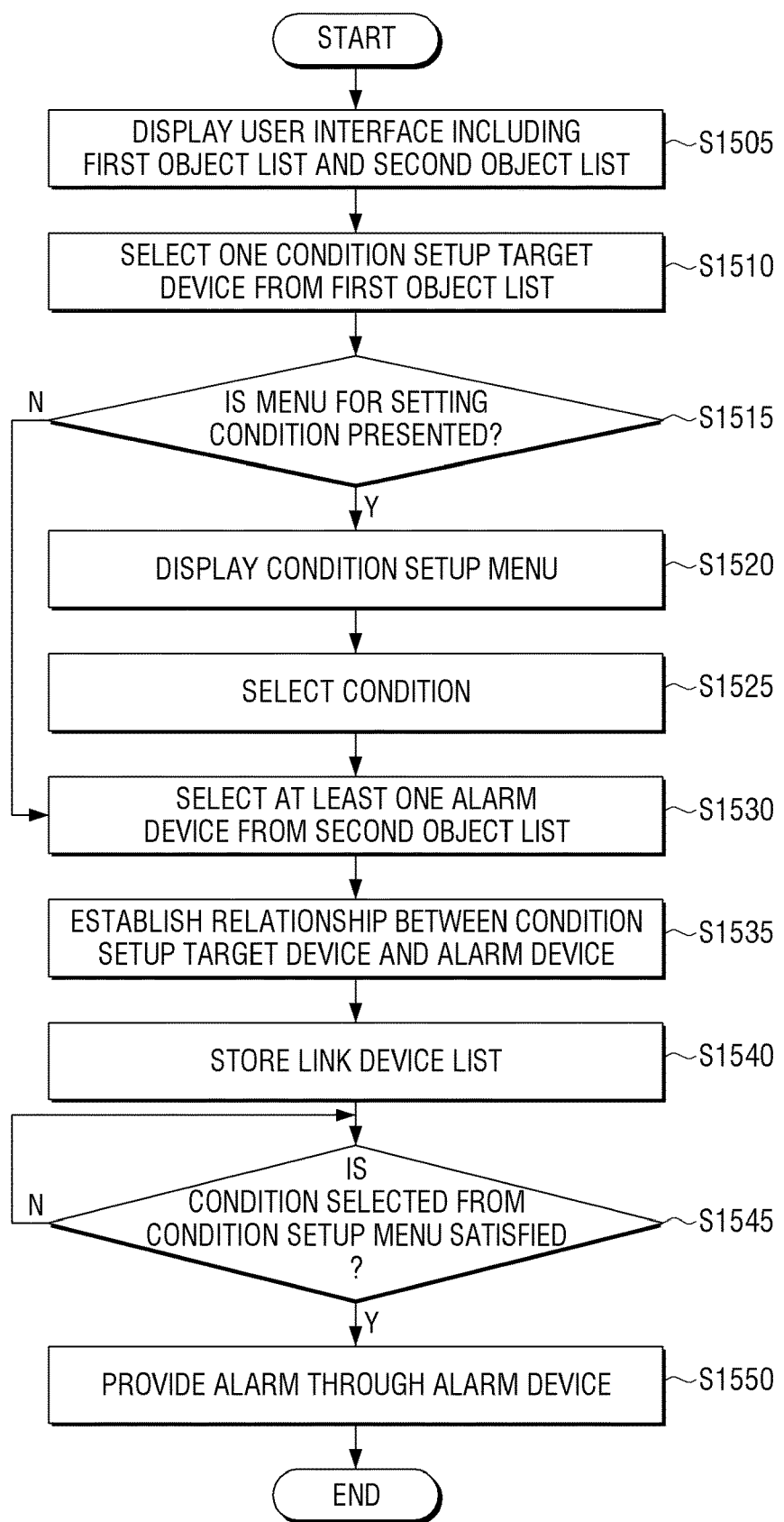
FIG. 15 is a flowchart illustrating a control method of a user terminal apparatus according to an embodiment of the present disclosure.

FIG. 15 is a flowchart illustrating a control method of a user terminal apparatus according to an embodiment of the present disclosure.

First, the user terminal apparatus may display a UI including a first object list and a second object list at operation S1505. The user terminal apparatus may select one condition setup target device from the first object list according to the user command through the displayed UI at operation S1510. After the condition setup target device is selected, the user terminal apparatus may determine whether or not a menu for setting a plurality of conditions to the corresponding condition setup target device is presented at operation S1515. In response to the menu for setting the condition being presented at operation S1515:Y, the user terminal apparatus may display the condition setup menu at operation S1520. In response to the condition being selected from the displayed condition setup menu at operation S1525, the user terminal apparatus may select at least one alarm device from the second object list according to the user command at operation S1530. In response to the menu for setting the condition being not presented at operation S1515:N, the condition setup menu may not be displayed and the user terminal apparatus may select the at least one alarm device from the second object list according to the user command at operation S1530.

In response to the alarm device being selected, a relationship between the condition setup target device selected from the first object list and the alarm device selected from the second object list may be established at operation S1535. The condition setup target device and the alarm device that the relationship is established may be stored in a link device list and managed at operation S1540.

In response to the condition selected from the condition setup menu for the condition setup target device being satisfied at operation S1545:Y, an alarm may be provided through the alarm device that the relationship with the corresponding condition setup target device is established at operation S1550.

The control method of the user terminal apparatus 100 according to the various embodiments may be implemented with a program and then stored in various recording mediums. For example, a computer program which may be processed through various processors and execute the above-described control methods may be stored in a recoding medium and used in a stored form.

For example, a non-transitory computer-readable medium, in which a program for performing operations of displaying a UI which includes a first object list including an object indicating at least one device in which a specific condition is set among a plurality of devices constituting an IoT environment and a second object list including an object indicating at least one which provides an alarm in response to the specific condition being satisfied; selecting objects from the first object list and the second object list through the UI; and controlling devices corresponding to the objects selected from the first object list and the second object list so that the device corresponding to the object selected from the second object list is set as a device which provides the alarm according to satisfaction of the specific condition set to the device corresponding to the object selected from the first object list is stored, may be provided.

The non-transitory computer-readable medium is not a medium configured to temporarily store data such as a register, a cache, or a memory but an apparatus-readable medium configured to permanently or semi-permanently store data. For example, the above-described applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An Internet of things (IoT) environment-based user terminal apparatus comprising:
   a transceiver;
   a display; and
   at least one processor configured to:
      control the display to display a first list including information about an IoT device and a plurality of conditions of the IoT device,
      control the display to display a second list including information about a plurality of IoT devices,
      based on a first condition of the IoT device being selected among the plurality of conditions through the first list and a first electronic device being selected among the plurality of IoT devices through the second list, transmit, through the transceiver, a signal to set the first electronic device as an electronic device corresponding to the first condition of the IoT device to the first electronic device, wherein the first electronic device provides a first alarm in response to a satisfaction of the first condition of the IoT device,
      based on a second condition of the IoT device being selected among the plurality of conditions through the first list and a second electronic device being selected among the plurality of IoT devices through the second list, transmit, through the transceiver, a signal to set the second electronic device as an electronic device corresponding to the second condition of the IoT device, wherein the second electronic device provides a second alarm in response to a satisfaction of the second condition of the IoT device,
      control the display to display a first graphic UI (GUI) region indicating a first connection relationship between the IoT device and the first electronic device and a second connection relationship between the IoT device and the second electronic device,
      based on the second electronic device and a third electronic device among the plurality of IoT devices being selected through the second list, transmit, through the transceiver, a signal to set the third electronic device as an electronic device corresponding to the second condition of the IoT device, wherein the second and third electronic device provide the second alarm in response to the satisfaction of the second condition of the IoT device, and
      control the display to display a second GUI region indicating a third connection relationship between the second electronic device and the third electronic device.

2. The user terminal apparatus as claimed in claim 1, wherein the at least one processor is further configured to control the transceiver to:
   transmit, to the IoT device, a control signal, which sets a signal according to the satisfaction of the first condition to be transmitted to the first electronic device, and
   transmit, to the first electronic device, a control signal, which sets the alarm to be provided in response to the signal according to the satisfaction of the first condition being received in the first electronic device.

3. The user terminal apparatus as claimed in claim 1, wherein the at least one processor is further configured to control the display to display the first GUI, which indicates that the IoT device and the first electronic device are mutually coupled, in a state that the first list and the second list are simultaneously displayed.

4. The user terminal apparatus as claimed in claim 1, wherein the at least one processor is further configured to select the IoT device and the first electronic device in response to a touch and drag being performed from a region in which a first object corresponding to the IoT device is located to a region in which a second object corresponding to the first electronic device is located.

5. The user terminal apparatus as claimed in claim 1, wherein the at least one processor is further configured to, in response to a first object corresponding to the IoT device is selected from the first list, control the display to display a menu for setting at least one condition from among the plurality of conditions about a periphery of the first object.

6. The user terminal apparatus as claimed in claim 1, wherein the at least one processor is further configured to, in response to a second object corresponding to the first electronic device is selected from the second list, control the display to display a menu for setting an operation for providing the alarm about a periphery of the second object.

7. The user terminal apparatus as claimed in claim 1, wherein the at least one processor is further configured to:
   determine a pre-set priority for the plurality of IoT devices corresponding to the first list, and
   control the display to display information for the plurality of IoT devices corresponding to the first list in a high priority order.

8. A method of controlling an Internet of things (IoT) environment-based user terminal apparatus, the method comprising:
   displaying a first user list including information about an IoT device and a plurality of conditions of the IoT device;
   displaying a second list including information about a plurality of IoT devices;
   based on a first condition of the IoT device being selected among the plurality of conditions through the first list and a first electronic device being selected among the plurality of IoT devices through the second list, transmitting a signal to set the first electronic device as an electronic device corresponding to the first condition of the IoT device, wherein the first electronic device provides a first alarm in response to a satisfaction of the first condition of the IoT device;
   based on a second condition of the IoT device being selected among the plurality of conditions through the first list and a second electronic device being selected among the plurality of IoT devices through the second list, transmitting a signal to set the second electronic device as an electronic device corresponding to the second condition of the IoT device, wherein the second electronic device provides a second alarm in response to a satisfaction of the second condition of the IoT device;
   displaying a first graphic UI (GUI) region indicating a first connection relationship between the IoT device and the first electronic device and a second connection relationship between the IoT device and the second electronic device; and
   based on the second electronic device and a third electronic device among the plurality of IoT devices being selected through the second list, transmitting a signal to set the third electronic device as an electronic device corresponding to the second condition of the IoT device, wherein the second and third electronic device provide the second alarm in response to the satisfaction of the second condition of the IoT device; and displaying a second GUI region indicating a third connection relationship between the second electronic device and the third electronic device.

9. The method as claimed in claim 8, wherein the controlling further comprises:

transmitting, to the IoT device, a control signal, which sets a signal according to the satisfaction of the first condition to be transmitted to the first electronic device, and transmitting, to the first electronic device, a control signal, which sets the alarm to be provided in response to the signal according to the satisfaction of the first condition being received in the first electronic device.

10. The method as claimed in claim 8, further comprising:

displaying the first GUI which indicates that the IoT device and the first electronic device are mutually coupled in a state that the first list and the second list are simultaneously displayed.

11. The method as claimed in claim 8, further comprising:

in response to a first object corresponding to the IoT device being selected through the first list, displaying a menu for setting at least one condition from among the plurality of conditions about a periphery of the first object.

12. The method as claimed in claim 8, further comprising:

in response to a second object corresponding to the first electronic device being selected through the second list, displaying a menu for setting an operation for providing the alarm about a periphery of the second object.

* * * * *